United States Patent
Zhang et al.

(10) Patent No.: US 11,894,889 B2
(45) Date of Patent: *Feb. 6, 2024

(54) PHYSICAL ALIGNMENT FOR MULTIPLE INPUT MULTIPLE OUTPUT DEVICES

(71) Applicant: QUALCOMM Incorporated, San Diego, CA (US)

(72) Inventors: Danlu Zhang, Rancho Santa Fe, CA (US); Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 218 days.

This patent is subject to a terminal disclaimer.

(21) Appl. No.: 17/355,769

(22) Filed: Jun. 23, 2021

(65) Prior Publication Data
US 2022/0416848 A1 Dec. 29, 2022

(51) Int. Cl.
*H04B 7/04* (2017.01)
*H04B 7/0413* (2017.01)
*H01Q 3/26* (2006.01)
*H01Q 3/36* (2006.01)

(52) U.S. Cl.
CPC ........ *H04B 7/0413* (2013.01); *H01Q 3/267* (2013.01); *H01Q 3/36* (2013.01)

(58) Field of Classification Search
CPC ..... H01Q 3/2605; H01Q 21/29; H04B 7/0671
See application file for complete search history.

(56) References Cited

U.S. PATENT DOCUMENTS

| | | | | |
|---|---|---|---|---|
| 6,441,779 | B1* | 8/2002 | Bennett | H01Q 3/06 701/472 |
| 11,309,977 | B2* | 4/2022 | Tang | H04B 17/21 |
| 2021/0091863 | A1* | 3/2021 | Tang | H04B 17/12 |
| 2022/0416417 | A1 | 12/2022 | Zhang et al. | |

FOREIGN PATENT DOCUMENTS

JP 6586048 B2 10/2019
JP 6663328 B2 3/2020

OTHER PUBLICATIONS

International Search Report and Written Opinion—PCT/US2022/030569—ISA/EPO—Sep. 12, 2022.

* cited by examiner

*Primary Examiner* — Junpeng Chen
(74) *Attorney, Agent, or Firm* — Kevin M. Donnelly; Holland & Hart LLP

(57) ABSTRACT

Methods, systems, and devices for wireless communications are described. A first device, such as a user equipment (UE) or base station, may receive, at a first antenna of a first antenna array, a first set of reference signals. The first device may measure the phase for each of the reference signals and estimate a linear offset between the first antenna array and a second antenna array of a second device that transmitted the reference signals. The first device may adjust an alignment of the first antenna array according to the estimated linear offset. The first device may receive a second set of reference signals, measure the phase for each of the reference signals, and estimate one or more rotational offsets between the first antenna array and the second antenna array. The first device may adjust the alignment of the first antenna array based on the one or more rotational offsets.

28 Claims, 12 Drawing Sheets

PHYSICAL ALIGNMENT FOR MULTIPLE INPUT MULTIPLE OUTPUT DEVICES

TECHNICAL FIELD

The following relates to wireless communications, including determining misalignment conditions between a transmitting antenna array and a receiving antenna array and aligning the antenna arrays based on the misalignment conditions.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In multiple input, multiple output (MIMO) wireless communication scenarios, devices may communicate using antenna arrays to support relatively higher throughput. In some cases, devices may communicate using orbital angular momentum (OAM) multiplexing or rectangular antenna array multiplexing. In these environments, it may be beneficial for two antenna arrays to be aligned in order to support orthogonality of related signaling.

SUMMARY

The systems, methods and devices of this disclosure each have several innovative aspects, no single one of which is solely responsible for the desirable attributes disclosed herein.

A method for wireless communication at a first device is described. The method may include receiving, at a first antenna of a first antenna array of the first device from a second antenna of a second antenna array of a second device, a first set of reference signals that includes one or more reference signals, measuring, based on receiving the first set of reference signals, one or more first phases for the one or more reference signals, estimating, based on the measured one or more first phases, a linear offset between the first antenna array and the second antenna array, adjusting an alignment of the first antenna array based on the estimated linear offset, receiving, at a first set of multiple antennas of the first antenna array from a second set of multiple antennas of the second antenna array, a second set of reference signals that includes a set of multiple reference signals, measuring, based on receiving the second set of reference signals, a second set of multiple phases, each phase of the second set of multiple phases being measured for a respective reference signal of the set of multiple reference signals, estimating, based on the second set of multiple phases, one or more rotational offsets between the first antenna array and the second antenna array, and adjusting the alignment of the first antenna array based on the estimated one or more rotational offsets.

An apparatus for wireless communication at a first device is described. The apparatus may include a processor, memory coupled with the processor, and instructions stored in the memory. The instructions may be executable by the processor to cause the apparatus to receive, at a first antenna of a first antenna array of the first device from a second antenna of a second antenna array of a second device, a first set of reference signals that includes one or more reference signals, measuring, base at least in part on receiving the first set of reference signals, one or more first phases for the one or more reference signals, estimating, base at least in part on the measured one or more first phases, a linear offset between the first antenna array and the second antenna array, adjust an alignment of the first antenna array based on the estimated linear offset, receive, at a first set of multiple antennas of the first antenna array from a second set of multiple antennas of the second antenna array, a second set of reference signals that includes a set of multiple reference signals, measuring, base at least in part on receiving the second set of reference signals, a second set of multiple phases, each phase of the second set of multiple phases being measured for a respective reference signal of the set of multiple reference signals, estimating, base at least in part on the second set of multiple phases, one or more rotational offsets between the first antenna array and the second antenna array, and adjust the alignment of the first antenna array based on the estimated one or more rotational offsets.

Another apparatus for wireless communication at a first device is described. The apparatus may include means for receiving, at a first antenna of a first antenna array of the first device from a second antenna of a second antenna array of a second device, a first set of reference signals that includes one or more reference signals, means for measuring, based on receiving the first set of reference signals, one or more first phases for the one or more reference signals, means for estimating, based on the measured one or more first phases, a linear offset between the first antenna array and the second antenna array, means for adjusting an alignment of the first antenna array based on the estimated linear offset, means for receiving, at a first set of multiple antennas of the first antenna array from a second set of multiple antennas of the second antenna array, a second set of reference signals that includes a set of multiple reference signals, means for measuring, based on receiving the second set of reference signals, a second set of multiple phases, each phase of the second set of multiple phases being measured for a respective reference signal of the set of multiple reference signals, means for estimating, based on the second set of multiple phases, one or more rotational offsets between the first antenna array and the second antenna array, and means for adjusting the alignment of the first antenna array based on the estimated one or more rotational offsets.

A non-transitory computer-readable medium storing code for wireless communication at a first device is described. The code may include instructions executable by a processor to receive, at a first antenna of a first antenna array of the first device from a second antenna of a second antenna array of a second device, a first set of reference signals that includes one or more reference signals, measuring, base at least in part on receiving the first set of reference signals, one or more first phases for the one or more reference signals, estimating, base at least in part on the measured one or more first phases, a linear offset between the first antenna array and the second antenna array, adjust an alignment of the first antenna array based on the estimated linear offset, receive, at a first set of multiple antennas of the first antenna array from a second set of multiple antennas of the second antenna array, a second set of reference signals that includes a set of multiple reference signals, measuring, base at least in part on receiving the second set of reference signals, a second set of multiple phases, each phase of the second set of multiple phases being measured for a respective reference signal of the set of multiple reference signals, estimating, base at least in part on the second set of multiple phases, one or more rotational offsets between the first antenna array and the second antenna array, and adjust the alignment of the first antenna array based on the estimated one or more rotational offsets.

Some examples of the method, apparatuses, and non-transitory computer-readable medium described herein may further include operations, features, means, or instructions for estimating the linear offset includes determining a difference between a first phase for a first reference signal of the first set of reference signals and the first phase for a second reference signal of the first set of reference signals, and estimating the linear offset may be based on the difference.

Some examples of the method, apparatuses, and non-transitory computer-readable medium described herein may further include operations, features, means, or instructions for estimating the linear offset may be based on the determined difference.

Some examples of the method, apparatuses, and non-transitory computer-readable medium described herein may further include operations, features, means, or instructions for receiving the first set of reference signals includes receiving the first set of reference signals at the first antenna that may be centered within the first antenna array, and estimating the linear offset may be based on receiving the first set of reference signals at the first antenna that may be centered within the first antenna array.

Some examples of the method, apparatuses, and non-transitory computer-readable medium described herein may further include operations, features, means, or instructions for estimating the linear offset includes estimating the linear offset based on a location of the second antenna within the second antenna array.

In some examples of the method, apparatuses, and non-transitory computer-readable medium described herein, the location may be on a first axis and a second axis that may be perpendicular to the first axis on the second antenna array, and estimating the linear offset includes estimating the linear offset based on the first axis and the second axis.

In some examples of the method, apparatuses, and non-transitory computer-readable medium described herein, the location may be a set of equidistant points from a center of the second antenna, and estimating the linear offset includes estimating the linear offset based on the set of equidistant points.

Some examples of the method, apparatuses, and non-transitory computer-readable medium described herein may further include operations, features, means, or instructions for estimating the one or more rotational offsets includes estimating the one or more rotational offsets responsive to adjusting the alignment of the first antenna array based on the estimated linear offset.

Some examples of the method, apparatuses, and non-transitory computer-readable medium described herein may further include operations, features, means, or instructions for estimating the one or more rotational offsets includes estimating differences among a set of distances between the second antenna array and the first antenna array based on the second set of multiple phases, each distance of the set of distances corresponding to a geographical distance between a respective antenna of the second set of multiple antennas and a respective antenna of the first set of multiple antennas, and estimating the one or more rotational offsets may be based on the estimated differences.

Some examples of the method, apparatuses, and non-transitory computer-readable medium described herein may further include operations, features, means, or instructions for receiving the second set of reference signals includes receiving the second set of reference signals at the first set of multiple antennas that may be positioned at a noncentral location of the first antenna array, and estimating one or more rotational offsets may be based on receiving the second set of reference signals at the first set of multiple antennas that may be positioned at the noncentral location of the first antenna array.

In some examples of the method, apparatuses, and non-transitory computer-readable medium described herein, estimating the one or more rotational offsets may include operations, features, means, or instructions for estimating a first rotational offset of the one or more offsets angles based on the second set of multiple phases, adjusting the alignment of the first antenna array in accordance with the first rotational offset, and estimating a second rotational offset of the one or more rotational angles based on adjusting the alignment of the first antenna array in accordance with the first rotational offset.

Some examples of the method, apparatuses, and non-transitory computer-readable medium described herein may further include operations, features, means, or instructions for measuring the one or more first phases, measuring the second set of multiple phases, or both may be based on receiving the first set of reference signals or the second set of reference signals at the first frequency and at the second frequency.

In some examples of the method, apparatuses, and non-transitory computer-readable medium described herein, the first frequency and the second frequency may be within a threshold frequency range that may be based on a sub-carrier spacing, a physical resource block size, or both.

Some examples of the method, apparatuses, and non-transitory computer-readable medium described herein may further include operations, features, means, or instructions for comparing two or more phases measured for the first set of reference signals, the second set of reference signals, or both, to a phase tolerance threshold and estimating the linear offset, the one or more rotational offsets, or both based on the two or more phases satisfying the phase tolerance threshold.

Some examples of the method, apparatuses, and non-transitory computer-readable medium described herein may further include operations, features, means, or instructions for estimating the linear offset, estimating the one or more rotational offsets, or both may be based on comparing the two or more phases.

Some examples of the method, apparatuses, and non-transitory computer-readable medium described herein may further include operations, features, means, or instructions for reestimating a rotational offset of the one or more rotational offsets after the alignment of the first antenna array may be adjusted based on the estimated one or more rotational offsets and readjusting the first antenna array based on the reestimated rotational offset such that the adjustment of the first antenna array satisfies a rotational adjustment threshold.

In some examples of the method, apparatuses, and non-transitory computer-readable medium described herein, estimating the one or more rotational offsets may include operations, features, means, or instructions for adjusting a position of the first antenna array along an axis perpendicular to the second antenna array and monitoring a slope of phase changes based on measurements of the second set of reference signals and estimating the one or more rotational offsets based on the slope of phase changes.

Some examples of the method, apparatuses, and non-transitory computer-readable medium described herein may further include operations, features, means, or instructions for adjusting the alignment of the first antenna array based on the estimated linear offset includes adjusting the alignment of the first antenna array such that a first axis of the first antenna array may be centered with a second axis of the second antenna array based on the estimated linear offset.

Some examples of the method, apparatuses, and non-transitory computer-readable medium described herein may further include operations, features, means, or instructions for adjusting the alignment of the first antenna array based on the one or more rotational offsets includes adjusting the alignment of the first antenna array such that the first set of multiple antennas of the first antenna array may be aligned along two or more axis with the second set of multiple antennas of the second antenna array.

DETAILED DESCRIPTION

Figure 1:
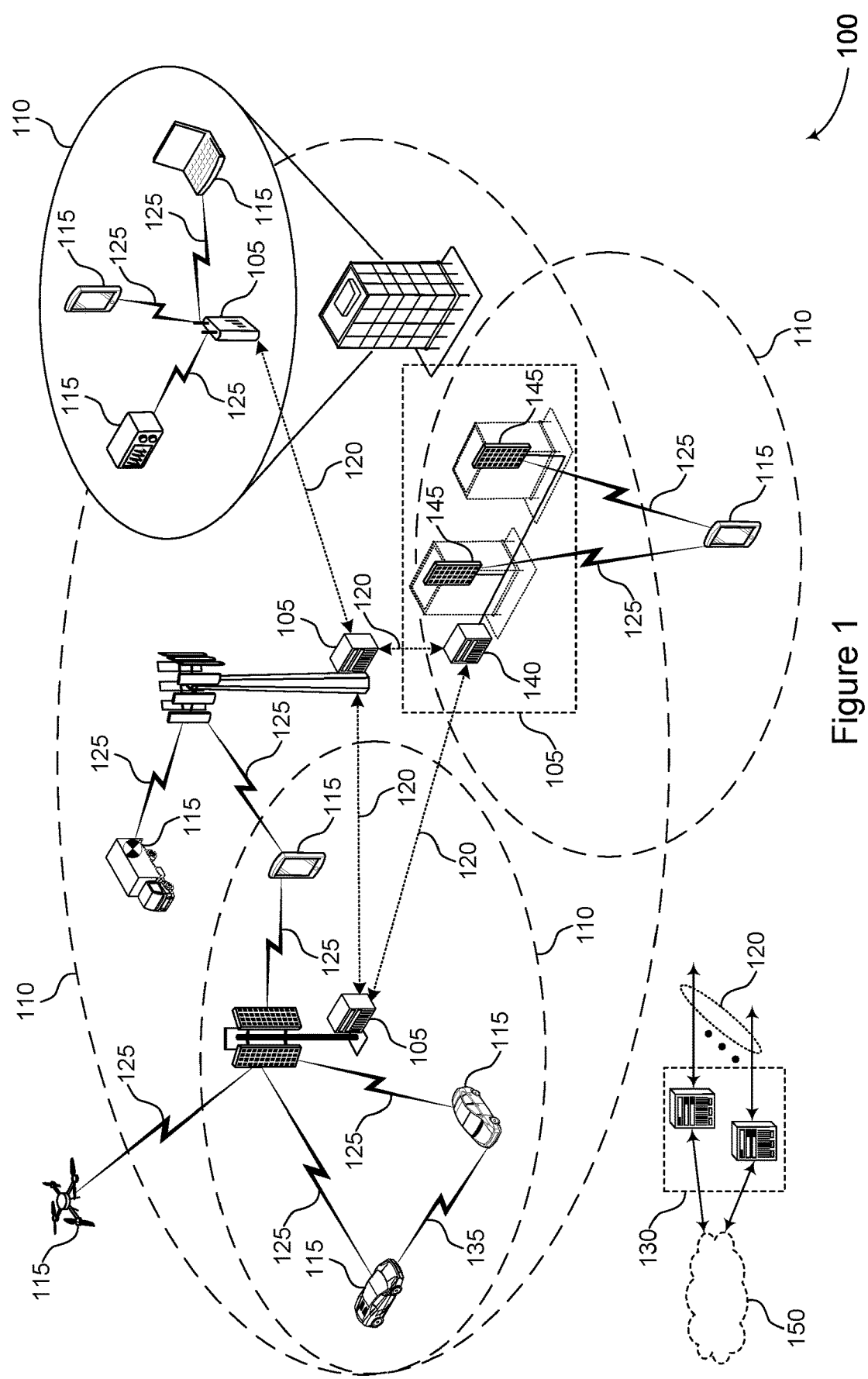
FIG. 1 illustrates an example of a wireless communications system that supports physical alignment for multiple input multiple output devices in accordance with aspects of the present disclosure.

Various wireless communication schemes, such as line-of-site multiple-input multiple-output (LoS-MIMO), are being considered for advanced wireless communication systems (for example, 6G wireless communication systems) to, for example, support high throughput over short distances. In such environments, two network nodes may communicate using one or more antenna arrays. For example, each of the network nodes may include an orbital angular momentum (OAM) antenna system having multiple antenna antennas arranged in one or more concentric circular antenna arrays, or an antenna system having one or more rectangular antenna arrays. The respective antenna arrays of the two network nodes may be installed such that they are aligned along a first axis (for example, a horizontal axis or a vertical axis) as well as rotationally (for example, such that respective antenna elements of an antenna array of one network node are aligned with respective antenna elements of an antenna array of the other network node in various rotational axes). It is important that the two antenna arrays are aligned to support wireless communication, such as LoS-MIMO, regardless of the type of antenna arrays implemented, for example, whether OAM arrays or rectangular arrays are used. With any misalignment (for example, axial misalignment or rotational misalignment) between respective antenna arrays of two network nodes, modes in OAM or LoS-MIMO between the network nodes may lose orthogonality, which may result in signal loss, among other disadvantages.

Various aspects generally relate to a transmitter device and a receiver device communicating according to a wireless communications scheme, such as a LoS-MIMO scheme, and more specifically, to the receiver device determining misalignment conditions (for example, a linear offset and one or more rotational angle offsets) for the receiver device antenna arrays and correcting these conditions, such as in a sequential manner. Specifically, aspects of the described techniques provide for determining two misalignment conditions between a transmitter antenna array and a receiver antenna array and correcting the misalignment conditions using one or more physical adjustments in order to align the receiver antenna array with the transmitter antenna array, thereby supporting maintaining orthogonality between the transmitter antenna array and the receiver antenna array. In some implementations, the receiving device may first estimate a linear offset between an antenna array of the receiving device and an antenna array of the transmitting device based on phase measurements of a first set of reference signals transmitted by the antenna array of the transmitting device and received by an antenna of the antenna array of the receiving device. The receiving device may then adjust an alignment (for example, a position or orientation) of its antenna array based on the estimated linear offset. In some such implementations, after adjustment of the antenna array for the linear offset, the receiving device may then estimate one or more rotational offsets based on phase measurements of a second set of reference signals transmitted between two or more antennas of the transmitting antenna array and two or more antennas of the receiving antenna array (for example, transmit-receive antenna pairs), which may in some examples be on or relatively near a peripheral edge of the antenna arrays. The receiving device may further adjust the position or orientation of its antenna array in order to correct for the one or more rotational offsets.

Particular aspects of the subject matter described in this disclosure may be implemented to realize one or more of the following potential advantages. The techniques employed by the described communication devices may provide benefits and enhancements to the operation of the communication devices, including supporting orthogonality between transmissions, such as for LoS-MIMO schemes, which may result in communication efficiencies, among other benefits. For example, operations performed by the described communication devices may provide improvements to LoS-MIMO procedures by reducing or correcting for a loss of orthogonality that may otherwise occur between the devices due to misaligned antenna arrays of the transmitting device and the receiving device. In some examples, operations performed by the described communication devices and related physical adjustments at the receiving device may also support improvements to power consumption, reliability for communications, spectral efficiency, higher data rates and, in some examples, low latency for communications, among other benefits.

Aspects of the disclosure are initially described in the context of wireless communications systems. Aspects of the disclosure are further illustrated by and described with reference to apparatus diagrams, system diagrams, and flowcharts that relate to physical alignment for multiple input multiple output devices.

FIG. 1 illustrates an example of a wireless communications system 100 that supports physical alignment for multiple input multiple output devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first device (for example, UE 115 or base station 105, which may be a receiving device in this example) may receive, at a first antenna of a first antenna array of the first device and from a second antenna of a second antenna array of a second device, a first set of reference signals that includes one or more reference signals. The first device may measure, based on receiving the first set of reference signals, a first phase of each of the first set of reference signals. The first device may estimate, based on the first phase of the first set of reference signals, a linear offset between the first antenna array and the second antenna array. The first device may receive, at a first plurality of antennas of the first antenna array of the first device and from a second plurality of antennas of the second antenna array of the second device, a second plurality of reference signals. The first device may measure, based on receiving the second plurality of reference signals, a second plurality of phases of each of the second plurality of reference signals. The first device may estimate, based on the second plurality of phases of the second plurality of reference signals, one or more rotational offsets between the first antenna array and the second antenna array. The first device may adjust the alignment of the first antenna array based on the linear offset, the one or more rotational offsets, or both.

A device (for example, the second device in this example, which may be an example of a UE 115 or a base station 105) may transmit, to a first antenna of a first antenna array of a first device and from a second antenna of a second antenna array of the device, a first set of reference signals that includes one or more reference signals. The device may transmit, to a first plurality of antennas of the first antenna array and from a second plurality of antennas of the second antenna array, a second plurality of reference signals.

Figure 2A:
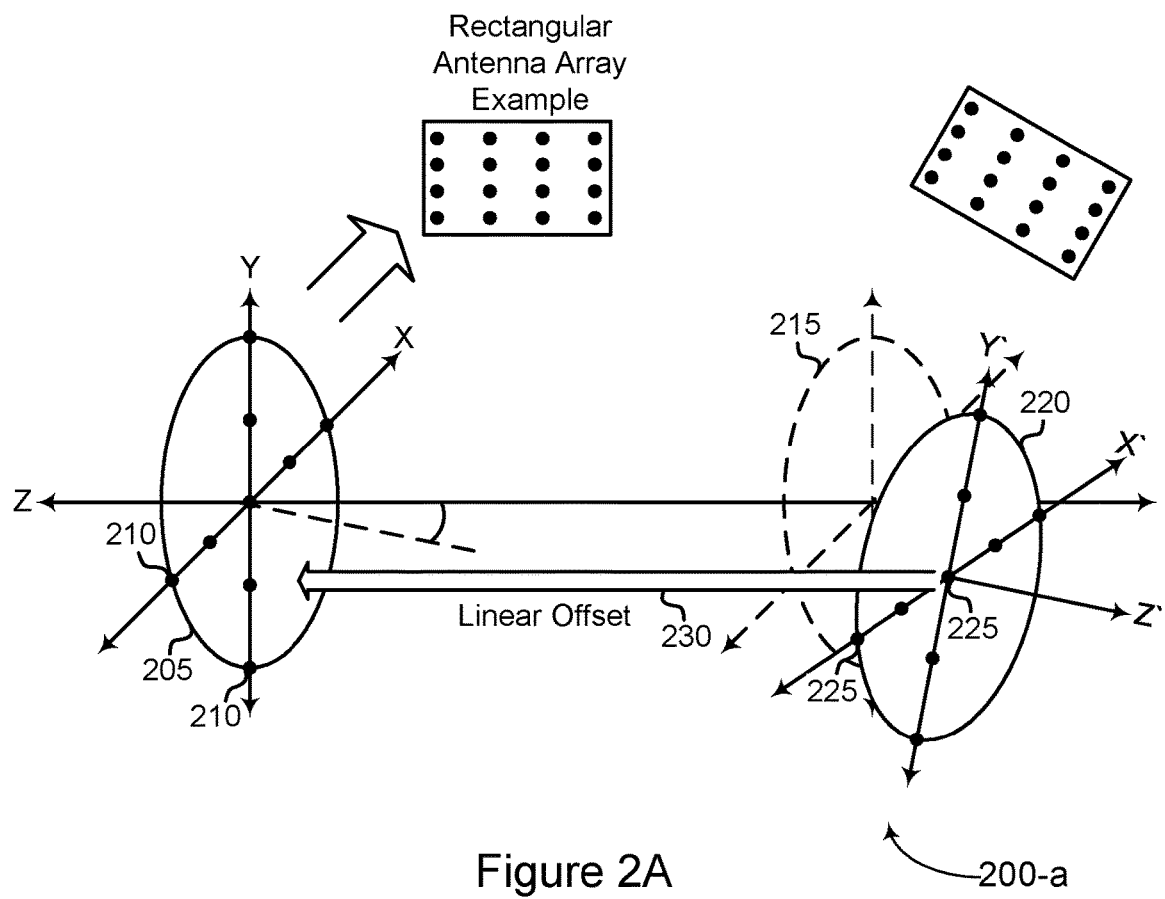
FIGS. 2A and 2B illustrates an example of an antenna array configuration that supports physical alignment for multiple input multiple output devices in accordance with aspects of the present disclosure.
Figure 2B:
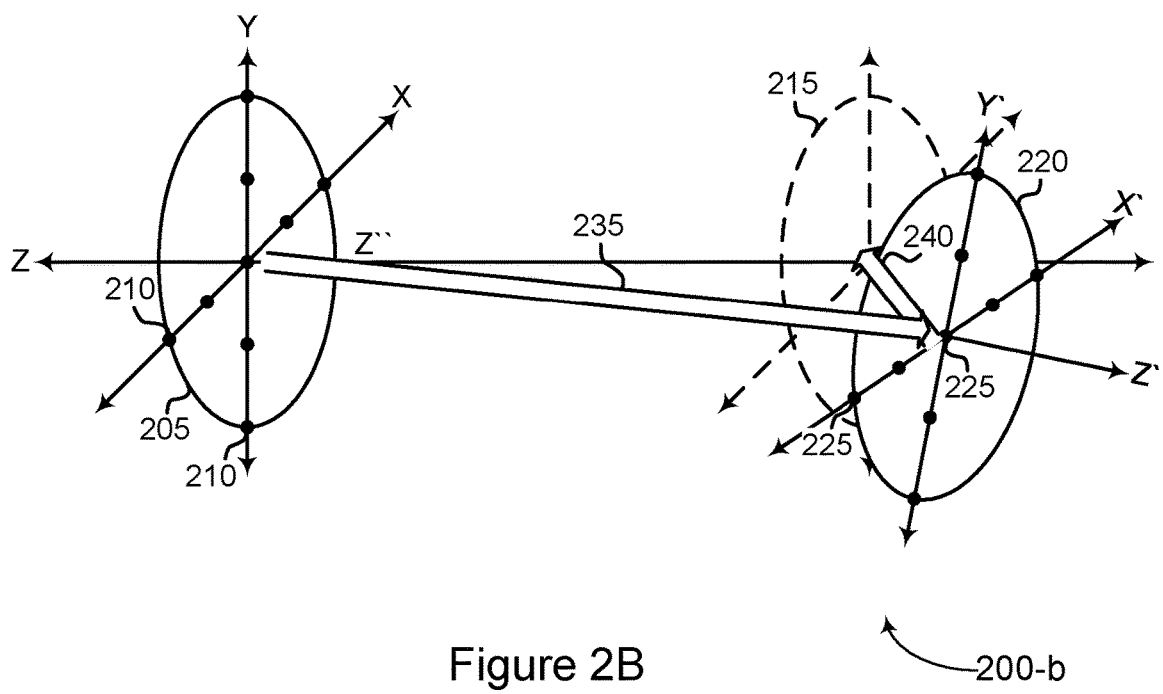

FIGS. 2A and 2B illustrate an example of an antenna array configuration 200 that supports physical alignment for multiple input multiple output devices in accordance with aspects of the present disclosure. The antenna array configuration 200 may implement aspects of or may be implemented by the wireless communications system 100. The antenna array configuration 200 may include a second antenna array 205 associated with a second device and a first antenna array 220 associated with a first device. In some aspects, the first device or the second device (or both) may be a UE or a base station (or some combination), which may be examples of the corresponding devices described herein.

The techniques described herein may be implemented by the first and second devices to align/compensate for misalignment between the second antenna array 205 and the first antenna array 220. Accordingly, the techniques described herein may be applied for UE-to-UE, base station-to-base station, UE-to-base station or base station-to-UE antenna array alignment/compensation between the first antenna array 220 and the second antenna array 205, or both As discussed herein, wireless communication systems may be configured to support OAM and other LoS-MIMO schemes to increase throughput over a short distance LoS deployment scenario. These deployment scenarios may include the first device installing, establishing, or otherwise configuring the first antenna array 220 and the second device installing, establishing, or otherwise configuring the second antenna array 205 such that each antenna array is coplanar with respect to the other antenna array. That is, each antenna array may include a plurality of antenna elements (for example, antenna elements 210 of the second antenna array 205 and antenna elements 225 of the first antenna array 220). Each antenna array may have a circular shape, rectangular shape, oval shape, square shape, among other examples. The aim if installing such antenna arrays is that the planar face of each antenna array is perfectly coplanar with respect to the planar face of the other antenna array along the Z axis, and are rotated such that each antenna element is aligned with a corresponding antenna element of the other antenna array (for example, antenna pairs) along the X and Y axis (for example, are rotated similarly around the Z axis). This may support Fresnel diffraction, which may be key to the presence of multiple channels supporting the MIMO communications with LoS.

Alignment of the receiving plane to the transmitting plane (for example, alignment of the planar face of the second antenna array 205 and the first antenna array 220) are important aspects for such LoS MIMO schemes, regardless of whether OAM (for example, concentric circles) or rectangular antenna arrays are used. Without such alignment, the modes in OAM and LoS-MIMO lose orthogonality with respect to each other, thus disrupting communications.

Typically, misalignment of the first antenna array 220 and the second antenna array 205 is common (at least initially), and therefore an alignment procedure is necessary before the communications sessions are established between the first device and the second device. Misalignment in some scenarios may include a linear offset (for example, linear off-axis) in which the planar face of the antenna arrays are offset along the Z axis, as well as rotational offset(s) in which the planar face of the antenna arrays are rotated around the Z axis or the planar face of one antenna array is tilted or otherwise leans such that it is not parallel to the planar face of the other antenna array. Accordingly, various degrees of freedom be present in the misalignment of the antenna arrays corresponding to the linear axis or the rotational offset(s) or both. If such misalignment is present, the transformation matrix has numerous variables that are tangled together, which makes it difficult to analyze or correct (or both) for the misalignment between the first antenna array 220 and the second antenna array 205.

One example of such misalignment is illustrated in the antenna array configuration 200-a of FIG. 2A. In this example, the second antenna array 205 is configured as shown such that the planar face of the second antenna array 205 is perpendicular to the Z axis and rotated such that the antenna elements 210 are positioned along the X and Y axis. An ideal placement for the first antenna array 220 is illustrated in dashed lines as antenna array placement 215. That is, antenna array placement 215 illustrates the ideal alignment of the first antenna array 220 with respect to the second antenna array 205. However, in the example illustrated in FIG. 2A, there is misalignment between the first antenna array 220 and the second antenna array 205. More particularly, the misalignment includes the first antenna array 220 being positioned herein the Z axis, and therefore having a corresponding linear offset 230. That is, a transmission from a center antenna element 225 of the first antenna array 220 may not align with the corresponding center antenna element 210 of the second antenna array 205.

Additionally, the first antenna array 220 is rotated about the Z axis such that the X and Y axis of the first antenna array 220 are not aligned with the corresponding X and Y axis of the second antenna array 205. Furthermore, the first antenna array 220 is tilted along the X/Y axis such that the planar face of the second antenna array 205 is not parallel with the planar face of the first antenna array 220. Again, if such misalignment is present, the variables of the transformation matrix are tangled to such a degree that analyzing or otherwise quantifying the misalignment between the second antenna array 205 and the first antenna array 220 is extremely difficult, and potentially sometimes prohibitively difficult. For example, it may not be feasible to have a reasonable sized set of codewords to use for pre-compensation due to the high dimensions (for example, due to the numerous degrees of freedom between the antenna array's misalignment). Moreover, physical alignment of the second antenna array 205 to the first antenna array 220 may be difficult in some mobility use cases. Finally, in some situations it may be impractical to physically place a lens (or other physical alignment aid) between the second antenna array 205 and the first antenna array 220 to aid in alignment.

Figure 3A:
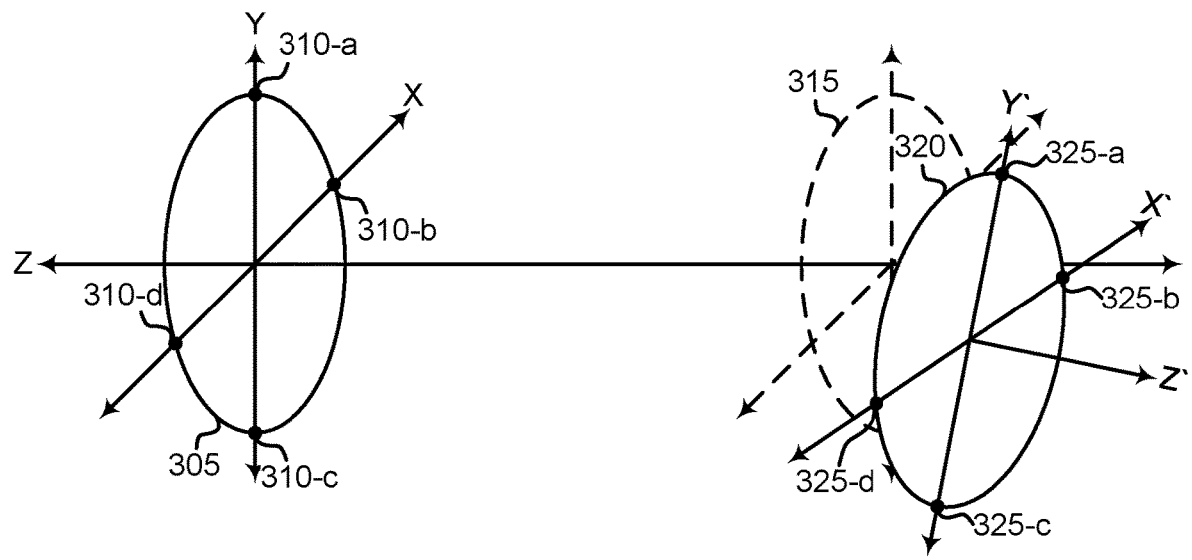
FIGS. 3A and 3B illustrates an example of an antenna array configuration that supports physical alignment for multiple input multiple output devices in accordance with aspects of the present disclosure.
Figure 3B:
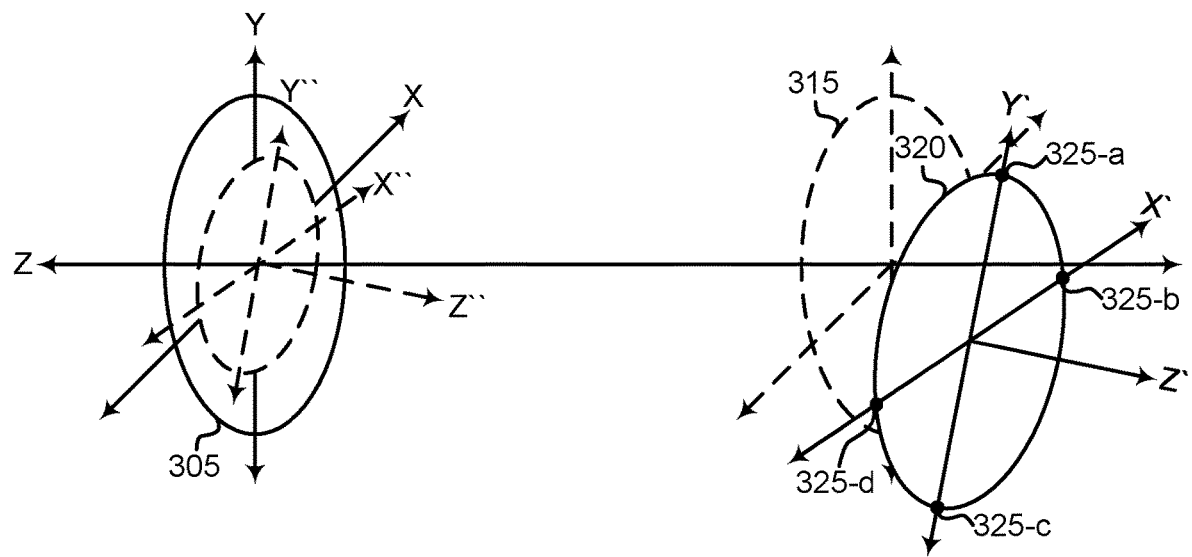

Accordingly, aspects of the described techniques provide for a sequential method to find misalignments and adjust the alignment at the receiving device (for example, the first device in this example) to compensate for the linear axis offset as well as the rotational offsets between the second antenna array 205 and the first antenna array 220. Broadly, the linear axis offset (for example, the off-axis offset) is initially estimated based on phase measurements at the center antennas along the X and Y axis using a reference signal transmitted from the second device. After the linear offset has been estimated and adjusted for, the rotational offsets are then estimated and compensated for using multiple reference signals transmitted from the peripheral antenna elements 210 of the second antenna array 205. For example, the rotational offset(s) are estimated based on phase measurements among the antenna element pairs along the X and Y axis using reference signals transmitted from the corresponding antenna array antenna elements. Accordingly, the phase terms from the rotational offsets are no longer tangled with the linear offset, which supports sequentially estimating and correcting for the linear offset or rotational offset (or both). FIGS. 2A and 2B illustrate examples of the linear offset estimation/adjustment aspects of the described techniques, with FIGS. 3A and 3B illustrating examples of the rotational offset(s) estimation/adjustment aspects of the described techniques.

Accordingly, this may include the second device transmitting a first set of reference signals (for example, one or more reference signals). Broadly, the first set of reference signals may be transmitted from a central or center antenna element 210 of the second antenna array 205 of the second device. The first set of reference signals may be transmitted to a corresponding central or center antenna element 225 of the first antenna array 220 of the first device (for example, the corresponding antenna pair). The first device may receive the first set of reference signals at the first antenna element 225 of the first antenna array 220 transmitted from the second device. Accordingly, the first device may measure a first phase of each reference signal in the first set of reference signals. Based on the first phase measured by the first device, the first device may then estimate the linear offset between the first antenna array 220 and the second antenna array 205. For example, the first device may determine difference between the distance between the first antenna element 210 and the second antenna element 225 and the distance between another antenna element 210 and the second antenna element 225 along the linear axis that is perpendicular to the plane (for example, the planar face) of the second antenna array 205. More particularly, the first device may not directly determine the distance between the respective antenna elements, but the first device may estimate the difference in the distances based on the phase measurements in order to determine the linear offsets. The first device may compare a physical distance between the center of the first antenna array 220 and the center of the second antenna array 225 along the linear axis to determine or otherwise estimate or calculate the linear offset. That is, the distance may correspond to the horizontal distance along the horizontal axis and a vertical distance along a vertical axis. The horizontal axis and the vertical axis (for example, the X and Y planes, respectively) may be perpendicular to the plane of the second antenna array 205.

In some aspects, rectangular coordinates may be used for the algorithms, although the results may be easy applicable to OAM and Polar coordinates. The coordinates for the receive plane (for example, for the first antenna array 220) may have their origin at $(X_0, Y_0, Z_0)$ and $(-\gamma, -\beta, -\alpha)$ with respect to the X-, Y-, and Z-axis. The coordinates for the transmit plane (for example, for the second antenna array 205) may be at a rotational angle of $(\gamma, \beta, \alpha)$ with respect to the Z-, Y-, and X-axis, respectively.

With respect to coordinate transform (for example, with respect to the rotation matrix), a point with receive plane coordinates of (x', y', z') has its coordinates in the transmit plane according to Equation (1) below:

$$\begin{bmatrix} x \\ y \\ z \end{bmatrix} = \begin{bmatrix} x_0 \\ y_0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix} \quad (1)$$

In a direction solution approach to estimating/adjusting for the misalignment, the coordinates $X_0, Y_0, Z_0, \gamma, \beta, \alpha$ leave six unknown variables to solve for, which may be difficult to solve for given the degree of freedom between the antenna arrays.

However, the techniques described herein provide an iterative approach to solve for these variables, to adjust for the misalignment between the first antenna array 220 and the second antenna array 205. This may include making the transmit plane (for example, the second antenna array 205) appear as (x", y", z") to the receive plane (for example, the first antenna array 220).

As discussed herein, this may include the first device measuring a first phase of each reference signal on the first set of reference signals and projecting the origin of the receive plane to the transmit plane along the Z axis (for example, corresponding to the linear offset 230). Estimating the linear offset 230 may include the first device measuring (for example, based on the first phase distance) the distance between the first antenna and the second antenna along the linear axis that is perpendicular to the plane of the second antenna array 205. For example, this may include the distance between the receive plane (0,0,0) and the transmit plane $(k_x, d_x, 0, 0)$—distance between the receive plane (0,0,0) and the receive plane (0,0,0).

In some aspects, the distance between the receive plane (0,0,0) (for example, the center of the first antenna array 220) and the transmit plane $(k_x, d_x, 0, 0)$—the distance between the receive plane (0,0,0) and the transmit plane (0,0,0) may be as according to Equation (2) below:

$$\approx \frac{-2k_x d_x x_0 + k_x^2 d_x^2}{2z_0} \quad (2)$$

And the distance between the receive plane (0,0,0) and the transmit plane ($k_y$, $d_y$,0,0)—the distance between the receive plane (0,0,0) and the transmit plane (0,0,0) may be as according to Equation (3) below:

$$\frac{-2k_y d_y y_0 + k_y^2 d_y^2}{2z_0} \quad (3)$$

The receive plane (0,0,0) may be the same as ($X_0$, $Y_0$, $Z_0$) in the transmit plane coordinates. With $d_x$ and $d_y$ known, the given observations at multiple $k_x$ and $k_y$, $x_0$, $y_0$, and $z_0$ can be solved (for example, using linear regression). To remove phase ambiguity (for example, based on $2\pi$), this may include using dense frequency sampling by the reference signal or may use extra units close to the origin (for example, additional centrally located antenna elements) for phase de-ambiguity because multiple modes may use Equation (4) below:

$$\frac{d_{max}^2}{\lambda z_0} \sim 1 \quad (4)$$

The multiple transmit units (for example, antenna elements) used for the phase measurements may not have to be equally spaced along the two axis (for example, as long as their respective locations are known to the receive device, such as the second device in this example). As discussed, reference signals may be used for the transmitting units (for example, the antenna elements) to support the phase measurements (for example, measurement of the first phase), with each unit being along the two axis (for example, the X and Y axis).

In one alternative, the linear offset may be estimated according to the distance between the receive plane (0,0,0) and the transmit plane ($k_x d_x$, 0,0)— the distance between the receive plane (0,0,0) and the transmit plane ($-k_x d_x$, 0,0) being according to Equation (5) below:

$$\approx \frac{-2k_x d_x x_0}{z_0} \quad (5)$$

The distance between the receive plane (0,0,0) and the transmit plane (0, $k_y d_y$, 0)—the distance between receive plane (0,0,0) and transmit plane (0, $-k_y d_y$, 0) being as according to Equation (6) below:

$$\approx \frac{-2k_y d_y y_0}{z_0} \quad (6)$$

With variables $k_x$, $k_y$, $d_x$ and $d_y$ known, the variables $$\frac{x_0}{z_0} \text{ and } \frac{y_0}{z_0}$$

can be solved. The variable $z_0$ by itself may or may not be used for alignment. This alternative also uses reference signals for the transmit units (for example, the antenna elements) used for phase measurements (for example, two units at the far end of each of the two axis).

To remove any ambiguity in the phase measurements, the total phase of reference signals (for example, the first set or the second plurality of reference signals or both) from (x, y, 0) at sub-carrier f1 may be as according to Equation (7) below:

$$\frac{2\pi f_1 d_{(x,y)}}{c} = \varphi_1(f_1) + m_{1,f_1}(2\pi) \quad (7)$$

The total phase of reference signal from (−x, y, 0) at sub-carrier f1 may be as according to Equations (8) and (9) below:

$$\frac{2\pi f_1 d_{(-x,y)}}{c} = \varphi_2(f_1) + m_{2,f_1}(2\pi) \quad (8)$$

$$\varphi_1(f_1) - \varphi_2(f_1) + (m_{1,f_1} - m_{2,f_1})(2\pi) = \frac{2\pi f_1}{c}(d_{(x,y)} - d_{(-x,y)}) \quad (9)$$

Likewise, $$\varphi_1(f_2) - \varphi_2(f_2) + (m_{1,f_2} - m_{2,f_2})(2\pi) = \frac{2\pi f_2}{c}(d_{(x,y)} - d_{(-x,y)}) \text{ and}$$

$$\varphi_1(f_1), \varphi_2(f_1), \varphi_1(f_2), \varphi_2(f_2)$$

may be observable by channel estimation based on the reference signal(s), but the unknown integer multiple of ($2\pi$) is also to be resolved.

If multiple of ($2\pi$) remains in [$\varphi_1(f_1)-\varphi_2(f_1)$]−[$\varphi_1(f_2)-\varphi_2(f_2)$], namely, ($m_{1,f_1}-m_{2,f_1}$)≠($n_{1,f_2}-m_{2,f_2}$), we may have $$\left|\frac{2\pi}{c}(f_1 - f_2)(d_{(x,y)} - d_{(-x,y)})\right| \geq 2\pi,$$

this implies $$|(d_{(x,y)} - d_{(-x,y)})| \geq \frac{c}{|f_1 - f_2|}.$$

In a typical use environment of passive MIMO, reference signals are placed densely in the frequency domain. $|f_1-f_2|$ may be on the order of sub-carrier spacing, physical resource block size, among other examples. So it may be assumed that $|f_1-f_2|\sim 10^2$ kHz, then the corresponding ambiguity length $|(d_{(x,y)}-d_{(-x,y)})|\sim 10^3$ m, which is sufficient to remove the phase ambiguity. Accordingly, this may include reference signal samples in the frequency domain with a density of the order of $10^2$ kHz, and receiver using multiple sub-carriers in the reference signal to remove phase ambiguity. It may be assumed that phase ambiguity is removed in the estimated differential distance such as $|(d_{(x,y)}-d_{(-x,y)})|$, although $d_{(x,y)}$ and $d_{(-x,y)}$ themselves may still have some degree of ambiguity. Accordingly, the first set of reference signals may be transmitted at a first frequency and the second plurality of reference signals may be transmitted at a second frequency that is within a frequency threshold of the first frequency.

Accordingly, the first device may determine the phase accuracy for the linear offset or the rotational offset(s) and adjust the first antenna array 220 accordingly. That is, the first device may physically adjust an alignment of the first antenna array 220 based on the linear offset or the rotational offset(s). The physical adjustments may be performed by one or more servos or motors, for example Referring next to the antenna array configuration 200-*b* of FIG. 2B, the first device in this example may physically adjust an alignment (for example, adjust in a direction 240) of the first antenna array 220 in order to align the respective axis (for example, the z axis) of the first antenna array 220 and the second antenna array 205 based on the estimated linear offset.

FIGS. 3A and 3B illustrate an example of an antenna array configuration 300 that supports physical alignment for multiple input multiple output devices in accordance with aspects of the present disclosure. The antenna array configuration 300 may implement aspects of or be implemented by wireless communications system 100 or aspects of the antenna array configuration 200 (or both). The antenna array configuration 300 may include a second antenna array 305 associated with a second device and a first antenna array 320 associated with a first device. In some aspects, the first device or the second device (or both) may be a UE or a base station (or some combination), which may be examples of the corresponding devices described herein.

Broadly, the antenna array configuration 300 and continues the discussion of the antenna array configuration 200. That is, the discussion of the antenna array configuration 200 included the second device transmitting or otherwise conveying a first set of reference signal(s) to a first antenna of the first antenna array 320 and from the second antenna of the second antenna array 305. The first device receives the first set of reference signal(s) and measures a first phase of each reference signal and the first set of reference signal(s). Based on the first phase, the first device may estimate the linear offset between a first antenna array 320 and the second antenna array 305. The first device may adjust the alignment of the first antenna array 320 based on the estimated linear offset. The antenna array configuration 300 provides an example where the first antenna array 320 has be estimated and adjusted for, such that the first antenna array 320 and the second antenna array 305 are aligned along the z axis (for example, centered at the respective z axis).

With reference to the antenna array configuration 300-*a* of FIG. 3A, as previously discussed orientation between the first antenna array 320 and the second antenna array 305 may be misaligned along the linear access (for example, along the Z access corresponding to the linear offset) as well as including one or more rotational offsets (for example, rotational angle offsets). The rotational offsets may correspond to the first antenna array 320 being rotated about the Z axis such that the antenna elements pairs are not aligned. For example, antenna element 310-*a* of the second antenna array 305 may be misaligned with respect to the corresponding antenna elements 325-*a* of the first antenna array 320. Similarly, antenna elements 310-*b* may be misaligned with reference to antenna element 325-*b*, antenna element 310-*c* may be misaligned with reference to antenna elements 325-*c*, and antenna elements 310-*d* may be misaligned with reference to antenna elements 325-*d*. Such misalignment may also be based on the planer face of the first antenna array 320 being non-coplanar with respect to the planer face of the second antenna array 305. That is, the first antenna array 320 may be positioned in a manner inconsistent with the antenna array placement 315.

Aspects are described herein for determining the rotational offsets in terms of rotational angle offsets (for example, rotational angles along one or more axis at the first antenna array 320 relative to the second antenna array 305).

As described herein, various types of coordinate systems may be used to estimate the offsets, including the rotational offsets. As such, the rotational offsets may be represented as an angle (for example, in degrees) or in another type of rotational measurement representation.

Turning to the antenna array configuration 300-*b* of FIG. 3B, aspects of the described techniques may also include the second device transmitting a second plurality of reference signals to a first plurality of antennas of the first antenna array 320 and from a second plurality of antennas of the second antenna array 305. For example, a reference signal may be transmitted from antenna element 310-*a* to antenna element 325-*a*, another reference signal may be transmitted from antenna element 310-*b* to antenna element 325-*b*, another reference signal may be transmitted from antenna element 310-*c* to antenna element 325-*c*, and another reference signal may be transmitted from antenna element 310-*d* to antenna elements 325-*d*. Accordingly, the first plurality of antennas in this example may be located at noncentral locations of the first antenna array, such as along the peripheral edge of each antenna array.

The first device may receive the second plurality reference signals and measure a corresponding second plurality of phases corresponding to the second probably reference signals. That is, the first device may measure the phase of the reference signal transmitted from antenna element 310-*a* to antenna element 325-*a*, and so forth. Based on the second plurality of phases, the first device may estimate the rotational offset(s) (for example, angle(s)) between the first antenna array 320 and the second antenna array 305. In some aspects, estimating the rotational angle(s) may be based on adjusting for the linear offset.

Accordingly, with the origin of the receive plain coordinate on the transmitting plane Z axis adjusted for, only the rotational angles RLF to be determined. This may be illustrated as according to Equation (10) below:

$$\begin{bmatrix} x \\ y \\ z \end{bmatrix} = \begin{bmatrix} 0 \\ 0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix} \quad (10)$$

An intuitive approach to this may be, if $\beta=0$ and $\gamma=0$, the following four distances may be considered equal: distance [receive plane $(d'_x, 0, 0)$ and transmit plane $(d_r, 0, 0)$], distance [receive plane $(-d'_x, 0, 0)$ and transmit plane $(-d_x, 0, 0)$], distance [receive plane $(0, d'_y, 0)$ and transmit plane $(0, d_y, 0)$], and distance [receive plane $(0, -d'_y, 0)$ and transmit plane $(0, -d_y, 0)$].

Rotational angle compensation if symmetric transmit plane and receive plane channel reciprocity may be based on the correlation between the antenna elements of the antenna arrays. For example, if there are the same number of transmit plane and receive plane units (for example, antenna elements), and each unit in the transmit plane (x,y,0) is paired with a corresponding receive plane unit (x',y',z'), then the following may be calculated: the distance between (x,y,z) and (x',y',z')—the distance between (0,0,0) (transmit plane) and (0,0,0)(receive plane). The distance/phase difference can be fed back by the first device; or if channel reciprocity is assumed, this can be estimated directly by the second device by transmissions from the first device. However, other scenarios may not have either symmetry or reciprocity.

In this situation, the distance [receive plane $(d'_x, 0,0)$ and transmit plane $$(d_x, 0,0)] = $$
$$\sqrt{(\cos\alpha\cos\beta d'_x - d_x)^2 + (\sin\alpha\cos\beta d'_x)^2 + (\sin\beta d'_x)^2 - 2\sin\beta d'_x z_0 + z_0^2} \approx z_0 +$$
$$\frac{(\cos\alpha\cos\beta d'_x - d_x)^2 + (\sin\alpha\cos\beta d'_x)^2 + (\sin\beta d'_x)^2 - 2\sin\beta d'_x z_0}{2z_0}$$

and the distance [receive plane $(-d'_x, 0,0)$ and transmit plane $$(-d_x, 0,0)] =$$
$$\sqrt{(-\cos\alpha\cos\beta d'_x + d_x)^2 + (-\sin\alpha\cos\beta d'_x)^2 + (\sin\beta d'_x + z_0)^2} \approx z_0 +$$
$$\frac{(\cos\alpha\cos\beta d'_x - d_x)^2 + (\sin\alpha\cos\beta d'_x)^2 + (\sin\beta d'_x)^2 + 2\sin\beta d'_x z_0}{2z_0},$$

the distance [receive plane $(0, d'_y, 0)$ and transmit plane $$(0, d_y, 0)] = \sqrt{\begin{array}{l}[(\cos\alpha\sin\beta\sin\gamma - \sin\alpha\cos\gamma)d'_y]^2 + \\ [(\sin\alpha\sin\beta\sin\gamma + \cos\alpha\cos\gamma)d'_y - d_y]^2 + \\ (\cos\beta\sin\gamma d'_y + z_0)^2\end{array}} \approx z_0 +$$

$$\frac{\begin{array}{l}[(\cos\alpha\sin\beta\sin\gamma - \sin\alpha\cos\gamma)d'_y]^2 + \\ [(\sin\alpha\sin\beta\sin\gamma + \cos\alpha\cos\gamma)d'_y - d_y]^2 + \\ (\cos\beta\sin\gamma d'_y)^2 + 2\cos\beta\sin\gamma d'_y z_0\end{array}}{2z_0},$$

and the distance [receive plane $(0, -d_y', 0)$ and transmit plane $$(0, -d_y, 0)] = \sqrt{\begin{array}{l}[-(\cos\alpha\sin\beta\sin\gamma - \sin\alpha\cos\gamma)d'_y]^2 + \\ [-(\sin\alpha\sin\beta\sin\gamma + \cos\alpha\cos\gamma)d'_y + d_y]^2 + \\ (-\cos\beta\sin\gamma d'_y + z_0)^2\end{array}} \approx z_0 +$$

$$\frac{\begin{array}{l}[(\cos\alpha\sin\beta\sin\gamma - \sin\alpha\cos\gamma)d'_y]^2 + \\ [(\sin\alpha\sin\beta\sin\gamma + \cos\alpha\cos\gamma)d'_y - d_y]^2 + \\ (\cos\beta\sin\gamma d'_y)^2 - 2\cos\beta\sin\gamma d'_y z_0\end{array}}{2z_0},$$

Additionally, further steps may include {distance [receive plane $(d'_x, 0,0)$ and transmit plane $(d_x, 0,0)$]–distance [receive plane $(-d'_x, 0,0)$ and transmit plane $$(-d_x, 0,0)]\} \approx \frac{-2\sin\beta d'_x z_0}{z_0} \approx 2d'_x$$

$\sin \beta \propto \sin \beta$, the {distance [receive plane $(0, d'_y, 0)$ and transmit plane $(0, d_y, 0)$]–distance [receive plane $(0, -d'_y, 0)$ and transmit plane $$(0, -d_y, 0)]\} \approx \frac{2\cos\beta\sin\gamma d'_y z_0}{z_0} \approx 2d'_y$$

$\cos \beta \sin \gamma \propto \cos \beta \sin \gamma$. The asymmetry between $\beta$ and $\gamma$ may come from the 3D rotation matrix in which $(\alpha, \beta, \gamma)$ with respect to the z-, y- and x-axis of the transmit plane coordinates, in that order. Accordingly, $\beta$, $\gamma$ can be solved; then $\alpha$ can be solved by any one or multiple of the four distances above. Again, reference signals (for example, the second plurality of reference signals) are needed for the transmit plane units (for example, the antenna elements 310 of the second antenna array 305) may be used for phase measurements, wherein the units are at the four corners or peripheral edges of the transmit plane. In some examples, the transmit plane units are positioned at equidistance points from a central location of the second antenna array 305.

In some cases, the first device may use an incremental approach for estimating and adjust for the rotational misalignments. For example, for rotation along the x' and y' axis, the first device may first vary $\beta$ (rotating along y'-axis) to make distance[rx(d'$_x$, 0,0) and tx(d$_x$, 0,0)]–distance[rx(−d'$_x$, 0,0) and tx(−d$_x$, 0,0)]=0. Second, the first device may vary $\gamma$ (rotating along x'-axis) to make distance[rx(0, d'$_y$, 0) and tx(0, d$_y$, 0)]–distance[rx(0, −d'$_y$, 0) and tx(0, −d$_y$, 0)]=0. These two steps can be swapped (for example, vary $\gamma$ then vary $\beta$).

After the first device estimates and corrects for rotation in the x and y axis (such that $$\beta = 0, \gamma = 0), \text{ then } \begin{bmatrix}0\\0\\z_0\end{bmatrix} + \begin{bmatrix}\cos\alpha & -\sin\alpha & 0\\ \sin\alpha & \cos\alpha & 0\\ 0 & 0 & 1\end{bmatrix}\begin{bmatrix}x'\\y'\\z'\end{bmatrix}$$

The distance between rx(0, d'$_y$, 0) and tx(0, d$_y$, 0): $d \approx \sqrt{[z_0]^2 + (-\sin\alpha)^2 d'^2_y + [\cos\alpha d'_y - d_y]^2}$. The distance will be minimized at $\alpha=0$. In some cases, the direction of the rotation may be reversed in implementations where a rotational offset threshold (for example, 90 degrees) is enforced at the device (for example, due to physical limitations of the device).

Accordingly, using these techniques, the first device may measure the second plurality of phases and physically adjust the positioning/alignment of the first antenna array 320. For ample, the first antenna array 320 may be rotated, tilted, or otherwise repositioned such that the antenna elements 325 are aligned with corresponding antenna elements of the second antenna array 305.

According to another technique for determining rotations along the x' and y' axis, the first device may assume rx(0,0,0) is moved rx to (0,0, z'), observe the slope of phase changes; adjust $\beta$ (rotating along y'-axis) and $\gamma$ (rotating along x'-axis) such that the slope of phase change is maximized. Thus, the distance between (0,0, z') in rx to (0,0,0) in tx may be as according to Equations (11) and (12) below:

$$d = \sqrt{(z'\sin\beta)^2 + (z'\cos\beta\sin\gamma)^2 + (z'\cos\beta\cos\gamma + z_0)^2} = \qquad (11)$$
$$\sqrt{z'^2 + z_0^2 + 2z_0 z'\cos\beta\cos\gamma}$$

$$\frac{\partial d}{\partial z'} = \frac{z_0 \cos\beta\cos\gamma}{\sqrt{z'^2 + z_0^2 + 2z_0 z'\cos\beta\cos\gamma}} \qquad (12)$$

The slope is maximized with $\beta=0$, $\gamma=0$. Since $\cos \beta$ is close to 1 if $\beta \approx 0$ $$\left(\cos\beta \approx 1 - \frac{\beta^2}{2}\right),$$

the slope maximization may result in fairly large residual with β and γ. This method only uses one reference signal from the center but needs z direction movement.

In multiple steps discussed herein there is evaluation evaluate (for example, comparison) of distance, in which the evaluation of distance may be implemented by evaluation of the measured phase(s). The phase may have a periodicity of $2n$, but it may be assumed that such ambiguity has been removed based on the techniques discussed herein.

As also discussed herein, the accuracy of the phase measurements (which are used to estimate the distance between each antenna element) is important for accuracy. This may include assuming the received signal at one receive plane from the transmit plane, after coherent integration in time, is in the form $y = Ae^{j\theta} + z$, in which A is the signal amplitude and z ($z = z_r + jz_i$) is noise with $z_r$ and $z_i$ as the real and imaginary parts, respectively, and a total variance $\sigma^2$. In some aspects $$y = \text{Real}(y) + j\text{Imag}(y) = A\cos(\theta) + jA\sin(\theta) + z_r + jz_i \text{ and } \hat{\theta} =$$

$$\text{Phase}(y) = \arctan(y) = \arctan\left(\frac{A\sin(\theta) + z_i}{A\cos(\theta) + z_r}\right).$$

At high SINR, it can be assumed:

$$E[\hat{\theta}] \cong \theta, \text{Var}[\hat{\theta}] \cong \text{Var}\left[\arctan\left(\frac{A\sin(\theta) + z_i}{A\cos(\theta) + z_r}\right)\right] \cong$$

$$\left[\frac{1}{1+E\left\{\left|\frac{A\sin(\theta)+z_i}{A\cos(\theta)+z_r}\right|^2\right\}}\right]^2 \text{var}\left(\frac{A\sin(\theta)+z_i}{A\cos(\theta)+z_r}\right) \cong$$

$$\left[\frac{1}{1+\tan(\theta)^2}\right]^2 E\left|\frac{A\sin(\theta)+z_i}{A\cos(\theta)+z_r} - \frac{A\sin(\theta)}{A\cos(\theta)}\right|^2 \cong$$

$$\left[\frac{1}{1+\tan(\theta)^2}\right]^2 E\left|\frac{z_i\cos(\theta)+z_r\sin(\theta)}{A\cos(\theta)}\right|^2 =$$

$$\left[\frac{1}{1+\tan(\theta)^2}\right]^2 \frac{\frac{\sigma^2}{2}[1+\tan(\theta)^2]}{|A|^2} = \frac{1}{2SNR[1+\tan(\theta)^2]}.$$

At a high SINR, $$E[\hat{\theta}] \cong \theta, \text{Var}[\hat{\theta}] \cong \frac{1}{2SNR[1+\tan(\theta)^2]}.$$

The Var[$\hat{\theta}$] may be small if $\tan(\theta) \to \infty$, but this does not pose any practical problem because the singularity of $\tan(\theta)$ at $\theta = \pi/2$ and $\theta = 3\pi/2$ can be mitigated. To evaluate (for example, compare) two phases at two receive plane units, the phase difference which can be accurately estimate is around $$\frac{1}{\sqrt{SNR}}.$$

The phase difference could be small due to the very nature of par-axial approximation. Then the coherent integration may be used to boost SNR. No array gain is possible because no beamforming is used at this stage. Phase noise may be mitigated, or non-coherent integration can be used to further increase the phase difference evaluation (for example, comparison).

Accordingly, the first or second devices (or both) may determine the noise level for the channel between the first antenna array 320 and the second antenna array 305, which may determine the phase accuracy for the measurements, at least to some degree.

Moreover, there may be a timing aspect with respect to the described techniques. For example, the phase noise may hamper any phase evaluation (for example, comparison) of the same receive plane unit across time. Therefore, aspects of the described techniques maintain such comparison within the "coherence time" due to phase noise. An alternative is to avoid phase evaluation across time: evaluation across time can be replaced by evaluation across two receive units at the same time. If the phase ambiguity is an issue, then the evaluation (for example, comparison) may be made at two receive plane units that are close enough to each other for phase-deambiguity to work (for example, dense phase sampling). Phase noise may still have an impact on limiting the coherent integration time. Accordingly, the first device may evaluate the two or more phases measured for the first or second sets (or both) of reference signals based on the reference signals being communicated within a time threshold (for example, the coherence time).

Figure 4:
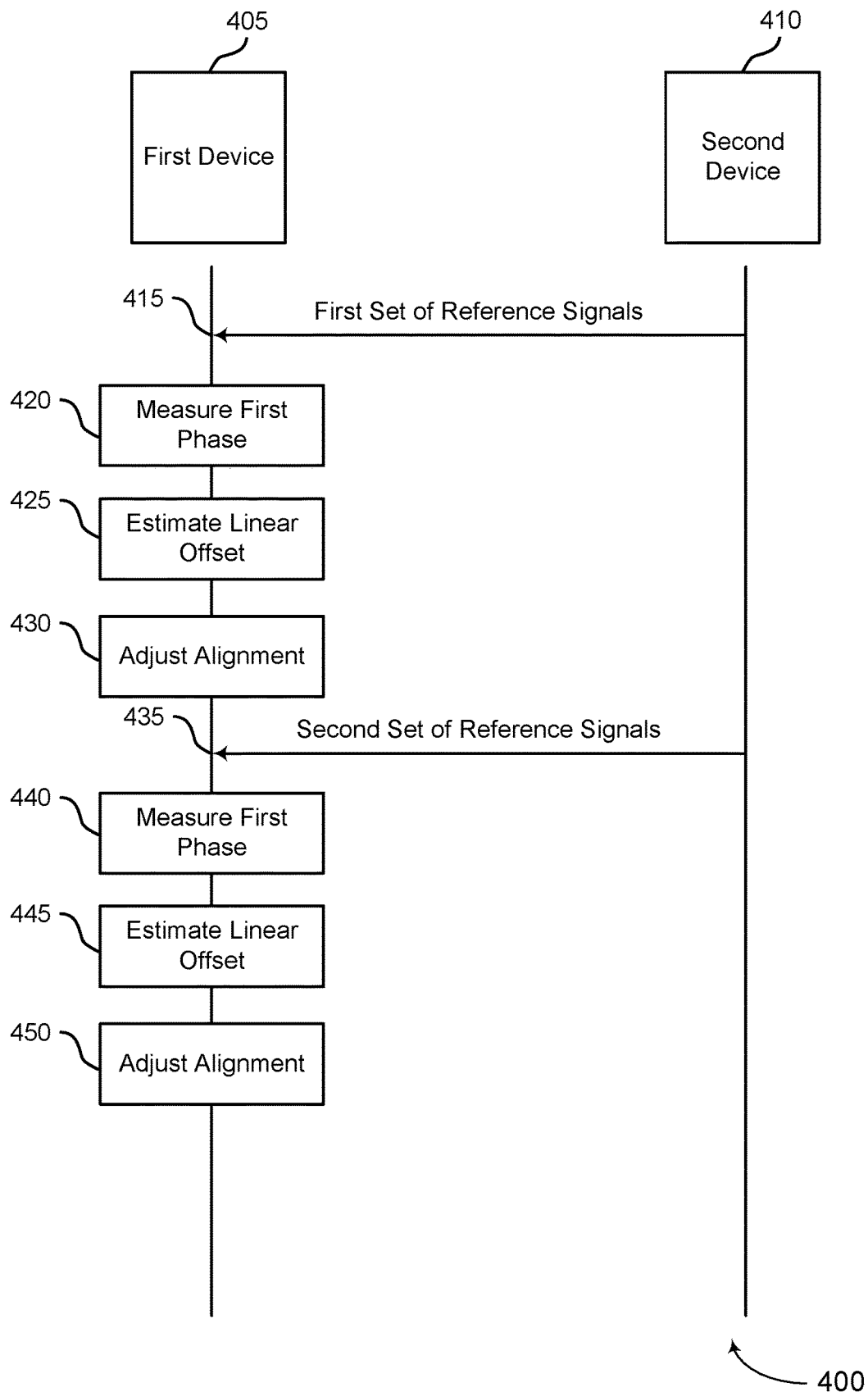
FIG. 4 illustrates an example of a process flow that supports physical alignment for multiple input multiple output devices in accordance with aspects of the present disclosure.

FIG. 4 illustrates an example of a process flow 400 that supports physical alignment for multiple input multiple output devices in accordance with aspects of the present disclosure. The process flow 400 includes a first device 405 and a second device 410, which may be examples of the corresponding devices described with respect to FIGS. 1 through 3. For example, the first device 405 or the second device 410 (or both) may be an example of a base station 105 or a UE 115, as described with respect to FIG. 1.

At 415, the first device may receive, at a first antenna of a first antenna array of the first device from a second antenna of a second antenna array of a second device, a first set of reference signals that includes one or more reference signals. The first antenna may be positioned in a central location of the first antenna array. In some implementations, the first set of reference signals may be received (for example, sampled) at two or more different frequencies in order to account for phase ambiguities between compared phases.

At 420, the first device 405 may measure based on receiving the first set of reference signals, one or more first phases for the one or more reference signals.

At 425, the first device 405 may estimate, based on the measured one or more first phases, a linear offset between the first antenna array and the second antenna array. In some implementations, the first device 405 may estimate the linear offset by determining differences between the phases measured for two or more of the reference signals. Additionally, or alternatively, the linear offset may be estimated based on a location of the second antenna at the second antenna array of the second device 410. For example, the second antenna may include one or more antennas, and the location of the second antenna may be along a first and second axis of the second antenna array. The first and second axis may be perpendicular axis (for example, x axis and y axis defining an xy plane). The second antennas may also be positioned on a set of equidistance points from a central location of the second antenna array.

At 430, the first device 405 may adjust an alignment of the first antenna array based on the estimated linear offset. For example, the antenna array may be adjusted or repositioned such that a first axis of the first antenna array is centered with a second axis of the second antenna array.

At 435, the first device 405 may receive at a first plurality of antennas of the first antenna array from a second plurality of antennas of the second antenna array, a second set of reference signals that includes a plurality of reference signals. In some implementations, the first plurality of antennas is positioned at a noncentral location of the first antenna array (for example, along an x and y axis of the first antenna array). In some implementations, the second set of reference signals may be received (for example, sampled) at two or more different frequencies in order to account for phase ambiguities between compared phases.

At 440, the first device 405 may measure, based on receiving the second set of reference signals, a second plurality of phases, each phase of the second plurality of phases being measured for a respective reference signal of the plurality of reference signals.

At 445, the first device 405 may estimate, based on the second plurality of phases, one or more rotational offsets between the first antenna array and the second antenna array. The first device 405 may estimate the one or more rotational offsets by estimating differences among a set of distances between the second antenna array and the first antenna array based on the second plurality of phases. Each distance of the set of distances may correspond to a geographical distance between a respective antenna of the second plurality of antennas and a respective antenna of the first plurality of antenna. That is, each distance may be a distance between an antenna of the second antenna array and a corresponding antenna of the first antenna array. In some cases, the first device 405 may estimate the rotational offsets according to a condition that each distance between corresponding antennas is to be equal. In some cases, the first device 405 may use an iterative approach to estimating and adjusting for rotational angles. For example, the device 405 may adjust an alignment for one of the rotational offsets (for example, such that the angle is zero), then estimate a second rotational offsets. In some implementations, the rotational offsets may be estimated using an iterative procedure whereby the first antenna array is adjusted along an axis perpendicular to the second antenna array. The first device 405 may monitor the slop of phase changes caused by the adjustments in order to estimate the rotational offsets.

At 450, the first device 405 may adjust the alignment of the first antenna array based on the estimated one or more rotational offsets. In some implementations, the first device 405 may adjust the alignment of the first antenna array such the first plurality of antennas of the first antenna array are aligned along two or more axis with the second plurality of antennas of the second antenna array. In some implementations, the first device 405 may reestimate a rotational offset after adjusting and readjust accordingly. The first device 405 may reestimate and readjust in order to keep a rotational adjustment total (for example, in one direction) herein a rotational adjustment threshold angle. Alignment may include an orientation of the first antenna array relative to the second antenna array, the position of the first antenna array relative to the second antenna array, or a combination of the orientation and the position. Thus, adjusting the alignment of the first antenna array based on the estimated linear offset (e.g., at 430) may include adjusting the orientation, position, or both, and adjusting the alignment based on the one or more rotational offsets may include adjusting the orientation, position, or both.

In some implementations, in order to estimate the linear offset or the rotational offset, the first device 405 may compare phases of the corresponding reference signals. The first device 405 may determine that the phases satisfy a phase tolerance before comparing the phases, such that the phase comparisons may produce accurate information. Further, the first device 405 may determine that two reference signals are received at the same time (or within a threshold duration of one another) before the phases are compared to estimate the linear offset or rotational offsets.

Figure 5:
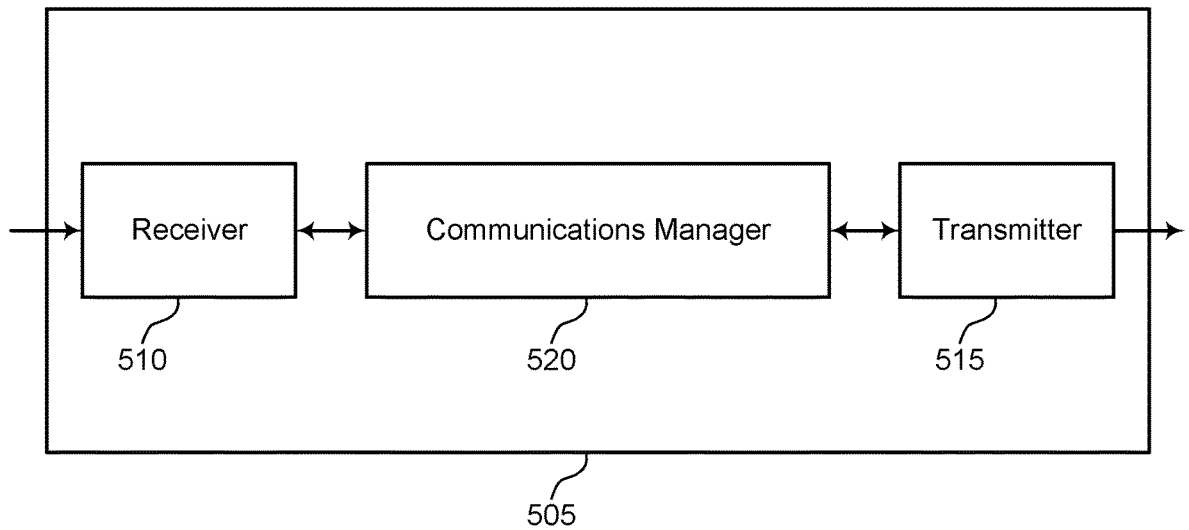
FIGS. 5 and 6 show block diagrams of devices that support physical alignment for multiple input multiple output devices in accordance with aspects of the present disclosure.

FIG. 5 shows a block diagram of a device 505 that supports physical alignment for multiple input multiple output devices in accordance with aspects of the present disclosure. The device 505 may be an example of aspects of a UE 115 or a base station 105 as described herein. The device 505 may include a receiver 510, a transmitter 515, and a communications manager 520. The device 505 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to physical alignment for multiple input multiple output devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to physical alignment for multiple input multiple output devices). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of physical alignment for multiple input multiple output devices as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 520, the receiver 510, the transmitter 515, or various combinations or components thereof may be implemented in code (for example, as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 520 may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device in accordance with examples as disclosed herein. For example, the communications manager 520 may be configured as or otherwise support a means for receiving, at a first antenna of a first antenna array of the first device from a second antenna of a second antenna array of a second device, a first set of reference signals that includes one or more reference signals. The communications manager 520 may be configured as or otherwise support a means for measuring, based at least in part on receiving the first set of reference signals, one or more first phases for the one or more reference signals. The communications manager 520 may be configured as or otherwise support a means for estimating, based at least in part on the measured one or more first phases, a linear offset between the first antenna array and the second antenna array. The communications manager 520 may be configured as or otherwise support a means for adjusting an alignment of the first antenna array based on the estimated linear offset. The communications manager 520 may be configured as or otherwise support a means for receiving, at a first set of multiple antennas of the first antenna array from a second set of multiple antennas of the second antenna array, a second set of reference signals that includes a set of multiple reference signals. The communications manager 520 may be configured as or otherwise support a means for measuring, based at least in part on receiving the second set of reference signals, a second set of multiple phases, each phase of the second set of multiple phases being measured for a respective reference signal of the set of multiple reference signals. The communications manager 520 may be configured as or otherwise support a means for estimating, based at least in part on the second set of multiple phases, one or more rotational offsets between the first antenna array and the second antenna array. The communications manager 520 may be configured as or otherwise support a means for adjusting the alignment of the first antenna array based on the estimated one or more rotational offsets.

By including or configuring the communications manager 520 in accordance with examples as described herein, the device 505 (for example, a processor controlling or otherwise coupled to the receiver 510, the transmitter 515, the communications manager 520, or a combination thereof) may support techniques for reduced processing and efficient utilization of communication resources by supporting orthogonality in LoS MIMO schemes. More particularly, by estimating misalignment of antenna arrays and adjusting based on the misalignment of the antenna arrays, the technique supports efficient communications because orthogonality may be maintained for the communications.

Figure 6:
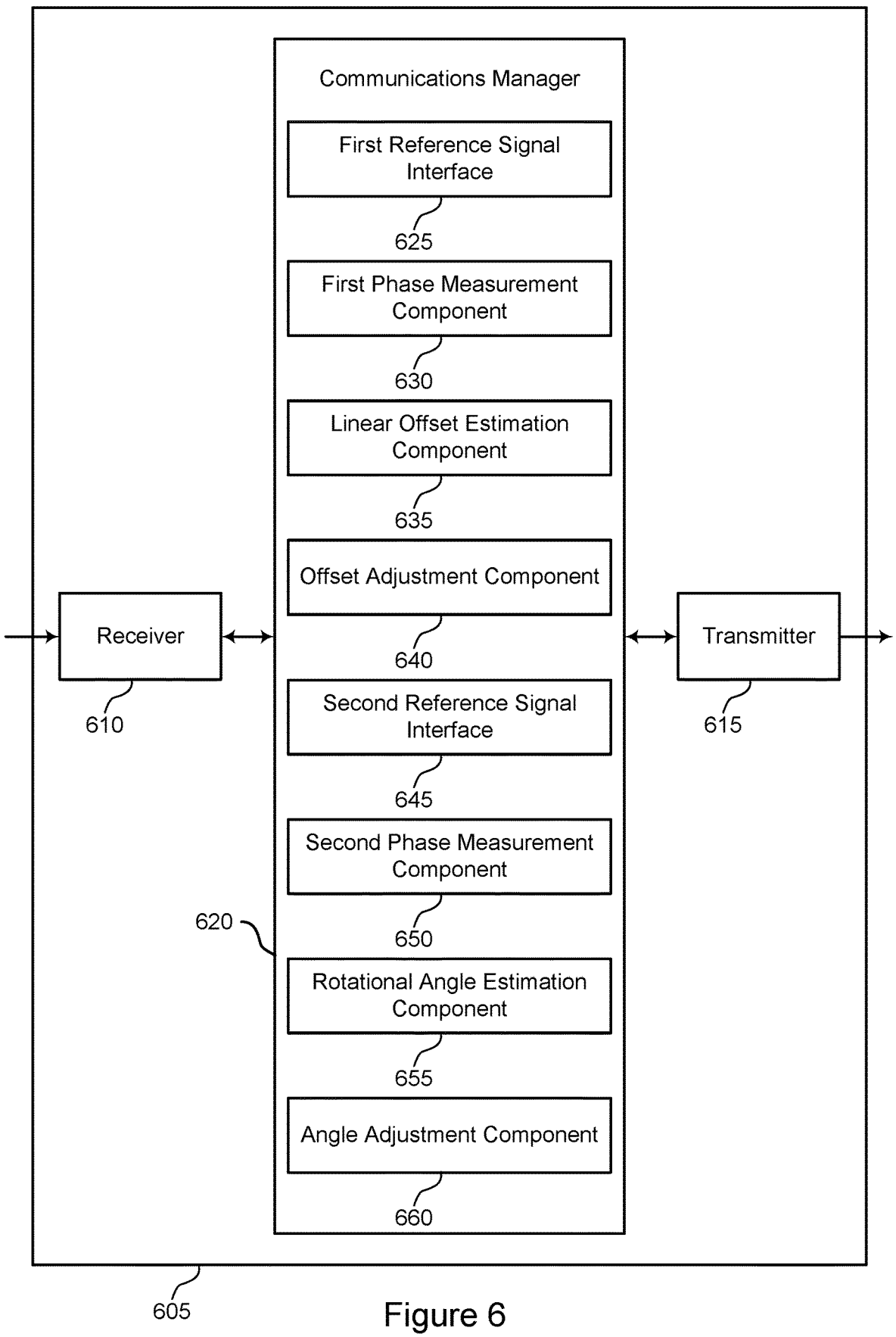

FIG. 6 shows a block diagram of a device 605 that supports physical alignment for multiple input multiple output devices in accordance with aspects of the present disclosure. The device 605 may be an example of aspects of a device 505, a UE 115, or a base station 105 as described herein. The device 605 may include a receiver 610, a transmitter 615, and a communications manager 620. The device 605 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to physical alignment for multiple input multiple output devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to physical alignment for multiple input multiple output devices). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of physical alignment for multiple input multiple output devices as described herein. For example, the communications manager 620 may include a first reference signal interface 625, a first phase measurement component 630, a linear offset estimation component 635, an offset adjustment component 640, a second reference signal interface 645, a second phase measurement component 650, a rotational angle estimation component 655, an angle adjustment component 660, or any combination thereof. In some examples, the communications manager 620, or various components thereof, may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. The first reference signal interface 625 may be configured as or otherwise support a means for receiving, at a first antenna of a first antenna array of the first device from a second antenna of a second antenna array of a second device, a first set of reference signals that includes one or more reference signals. The first phase measurement component 630 may be configured as or otherwise support a means for measuring, based on receiving the first set of reference signals, one or more first phases for the one or more reference signals. The linear offset estimation component 635 may be configured as or otherwise support a means for estimating, based on the measured one or more first phases, a linear offset between the first antenna array and the second antenna array. The offset adjustment component 640 may be configured as or otherwise support a means for adjusting an alignment of the first antenna array based on the estimated linear offset. The second reference signal interface 645 may be configured as or otherwise support a means for receiving, at a first set of multiple antennas of the first antenna array from a second set of multiple antennas of the second antenna array, a second set of reference signals that includes a set of multiple reference signals. The second phase measurement component 650 may be configured as or otherwise support a means for measuring, based on receiving the second set of reference signals, a second set of multiple phases, each phase of the second set of multiple phases being measured for a respective reference signal of the set of multiple reference signals. The rotational angle estimation component 655 may be configured as or otherwise support a means for estimating, based on the second set of multiple phases, one or more rotational offsets between the first antenna array and the second antenna array. The angle adjustment component 660 may be configured as or otherwise support a means for adjusting the alignment of the first antenna array based on the estimated one or more rotational offsets.

Figure 7:
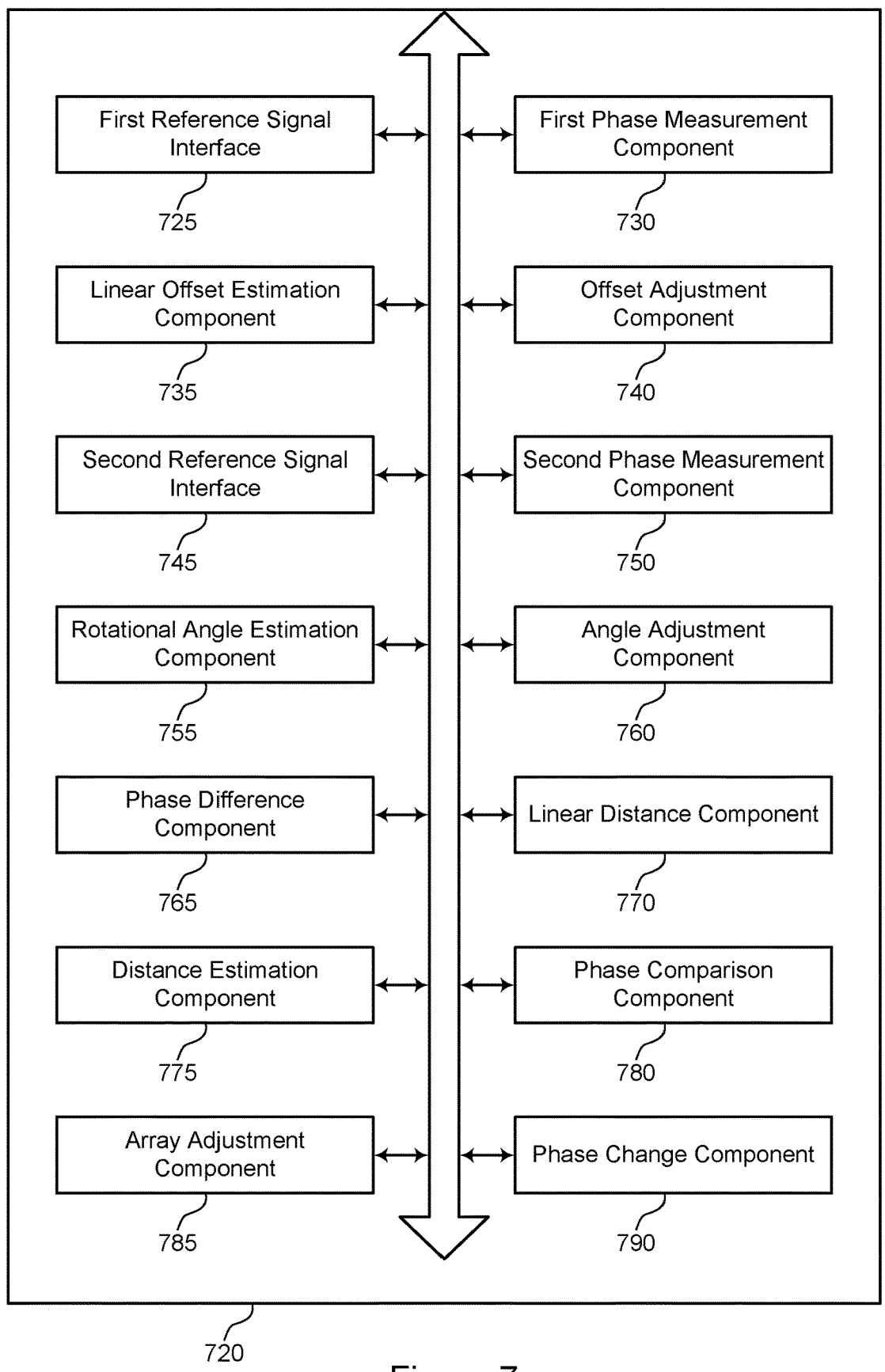
FIG. 7 shows a block diagram of a communications manager that supports physical alignment for multiple input multiple output devices in accordance with aspects of the present disclosure.

FIG. 7 shows a block diagram of a communications manager 720 that supports physical alignment for multiple input multiple output devices in accordance with aspects of the present disclosure. The communications manager 720, or various components thereof, may be an example of means for performing various aspects of physical alignment for multiple input multiple output devices as described herein. For example, the communications manager 720 may include a first reference signal interface 725, a first phase measurement component 730, a linear offset estimation component 735, an offset adjustment component 740, a second reference signal interface 745, a second phase measurement component 750, a rotational angle estimation component 755, an angle adjustment component 760, a phase difference component 765, a linear distance component 770, a distance estimation component 775, a phase comparison component 780, an array adjustment component 785, a phase change component 790, or any combination thereof. Each of these components may communicate, directly or indirectly, with one another (for example, via one or more buses).

The communications manager 720 may support wireless communication at a first device in accordance with examples as disclosed herein. The first reference signal interface 725 may be configured as or otherwise support a means for receiving, at a first antenna of a first antenna array of the first device from a second antenna of a second antenna array of a second device, a first set of reference signals that includes one or more reference signals. The first phase measurement component 730 may be configured as or otherwise support a means for measuring, based on receiving the first set of reference signals, one or more first phases for the one or more reference signals. The linear offset estimation component 735 may be configured as or otherwise support a means for estimating, based on the measured one or more first phases, a linear offset between the first antenna array and the second antenna array. The offset adjustment component 740 may be configured as or otherwise support a means for adjusting an alignment of the first antenna array based on the estimated linear offset. The second reference signal interface 745 may be configured as or otherwise support a means for receiving, at a first set of multiple antennas of the first antenna array from a second set of multiple antennas of the second antenna array, a second set of reference signals that includes a set of multiple reference signals. The second phase measurement component 750 may be configured as or otherwise support a means for measuring, based on receiving the second set of reference signals, a second set of multiple phases, each phase of the second set of multiple phases being measured for a respective reference signal of the set of multiple reference signals. The rotational angle estimation component 755 may be configured as or otherwise support a means for estimating, based on the second set of multiple phases, one or more rotational offsets between the first antenna array and the second antenna array. The angle adjustment component 760 may be configured as or otherwise support a means for adjusting the alignment of the first antenna array based on the estimated one or more rotational offsets.

In some examples, to support estimating the linear offset, the phase difference component 765 may be configured as or otherwise support a means for determining a difference between a first phase for a first reference signal of the first set of reference signals and the first phase for a second reference signal of the first set of reference signals, where estimating the linear offset is based on the difference.

In some examples, the linear distance component 770 may be configured as or otherwise support a means for determining a difference between a first a linear distance between the first antenna of the first antenna array of the first device and the second antenna of the second antenna array of the second device and a second linear distance between the first antenna of the first antenna array of the first device and a third antenna of the second antenna array based at least in part on the one or more first phases, wherein estimating the linear offset is based at least in part on the determined difference.

In some examples, to support receiving the first set of reference signals, the first reference signal interface 725 may be configured as or otherwise support a means for receiving the first set of reference signals at the first antenna that is centered within the first antenna array, where estimating the linear offset is based on receiving the first set of reference signals at the first antenna that is centered within the first antenna array.

In some examples, to support estimating the linear offset, the linear offset estimation component 735 may be configured as or otherwise support a means for estimating the linear offset based on a location of the second antenna within the second antenna array.

In some examples, to support estimating the linear offset, the linear offset estimation component 735 may be configured as or otherwise support a means for estimating the linear offset based on the first axis and the second axis.

In some examples, to support estimating the linear offset, the linear offset estimation component 735 may be configured as or otherwise support a means for estimating the linear offset based on the set of equidistant points.

In some examples, to support estimating the one or more rotational offsets, the rotational angle estimation component 755 may be configured as or otherwise support a means for estimating the one or more rotational offsets responsive to adjusting the alignment of the first antenna array based on the estimated linear offset.

In some examples, to support estimating the one or more rotational offsets, the distance estimation component 775 may be configured as or otherwise support a means for estimating differences among a set of distances between the second antenna array and the first antenna array based on the second set of multiple phases, each distance of the set of distances corresponding to a geographical distance between a respective antenna of the second set of multiple antennas and a respective antenna of the first set of multiple antennas, where estimating the one or more rotational offsets is based on the estimated differences.

In some examples, the rotational angle estimation component 755 may be configured as or otherwise support a means for estimating the one or more rotational offsets further based on a condition that each distance of the set of distances is to have a same value when the first set of multiple antennas are aligned with the second set of multiple antennas.

In some examples, the second reference signal interface 745 may be configured as or otherwise support a means for receiving the second set of reference signals at the first set of multiple antennas that are positioned at a noncentral location of the first antenna array, where estimating one or more rotational offsets is based on receiving the second set of reference signals at the first set of multiple antennas that are positioned at the noncentral location of the first antenna array.

In some examples, to support estimating the one or more rotational offsets, the rotational angle estimation component 755 may be configured as or otherwise support a means for estimating a first rotational offset of the one or more rotational offsets based on the second set of multiple phases. In some examples, to support estimating the one or more rotational offsets, the angle adjustment component 760 may be configured as or otherwise support a means for adjusting the alignment of the first antenna array in accordance with the first rotational offset. In some examples, to support estimating the one or more rotational offsets, the rotational angle estimation component 755 may be configured as or otherwise support a means for estimating a second rotational offset of the one or more rotational offsets based on adjusting the alignment of the first antenna array in accordance with the first rotational offset.

In some examples, the first set of reference signals, the second set of reference signals, or both are received at both a first frequency and a second frequency. In some examples, measuring the one or more first phases, measuring the second set of multiple phases, or both are based on receiving the first set of reference signals or the second set of reference signals at the first frequency and at the second frequency.

In some examples, the first frequency and the second frequency are within a threshold frequency range that is based on a sub-carrier spacing, a physical resource block size, or both.

In some examples, the phase comparison component 780 may be configured as or otherwise support a means for comparing two or more phases measured for the first set of reference signals, the second set of reference signals, or both, to a phase tolerance threshold. In some examples, the linear offset estimation component 735 may be configured as or otherwise support a means for estimating the linear offset, the one or more rotational offsets, or both based on the two or more phases satisfying the phase tolerance threshold.

In some examples, the phase comparison component 780 may be configured as or otherwise support a means for comparing two or more of phases measured for respective two or more reference signals of the first set of reference signals, the second set of reference signals, or both, based on the two or more reference signals being received at a same time, where estimating the linear offset, estimating the one or more rotational offsets, or both are based on comparing the two or more phases.

In some examples, the rotational offset estimation component 755 may be configured as or otherwise support a means for reestimating a rotational offset of the one or more rotational offsets after the alignment of the first antenna array is adjusted based on the estimated one or more rotational offsets. In some examples, the angle adjustment component 760 may be configured as or otherwise support a means for readjusting the first antenna array based on the reestimated rotational offset such that the adjustment of the first antenna array satisfies a rotational adjustment threshold.

In some examples, to support estimating the one or more rotational offsets, the array adjustment component 785 may be configured as or otherwise support a means for adjusting a position of the first antenna array along an axis perpendicular to the second antenna array. In some examples, to support estimating the one or more rotational offsets, the phase change component 790 may be configured as or otherwise support a means for monitoring a slope of phase changes based on measurements of the second set of reference signals and estimating the one or more rotational offsets based on the slope of phase changes.

In some examples, to support adjusting the alignment of the first antenna array based on the estimated linear offset, the offset adjustment component 740 may be configured as or otherwise support a means for adjusting the alignment of the first antenna array such that a first axis of the first antenna array is centered with a second axis of the second antenna array based on the estimated linear offset.

In some examples, to support adjusting the alignment of the first antenna array based on the one or more rotational offsets, the angle adjustment component 760 may be configured as or otherwise support a means for adjusting the alignment of the first antenna array such that the first set of multiple antennas of the first antenna array are aligned along two or more axis with the second set of multiple antennas of the second antenna array.

Figure 8:
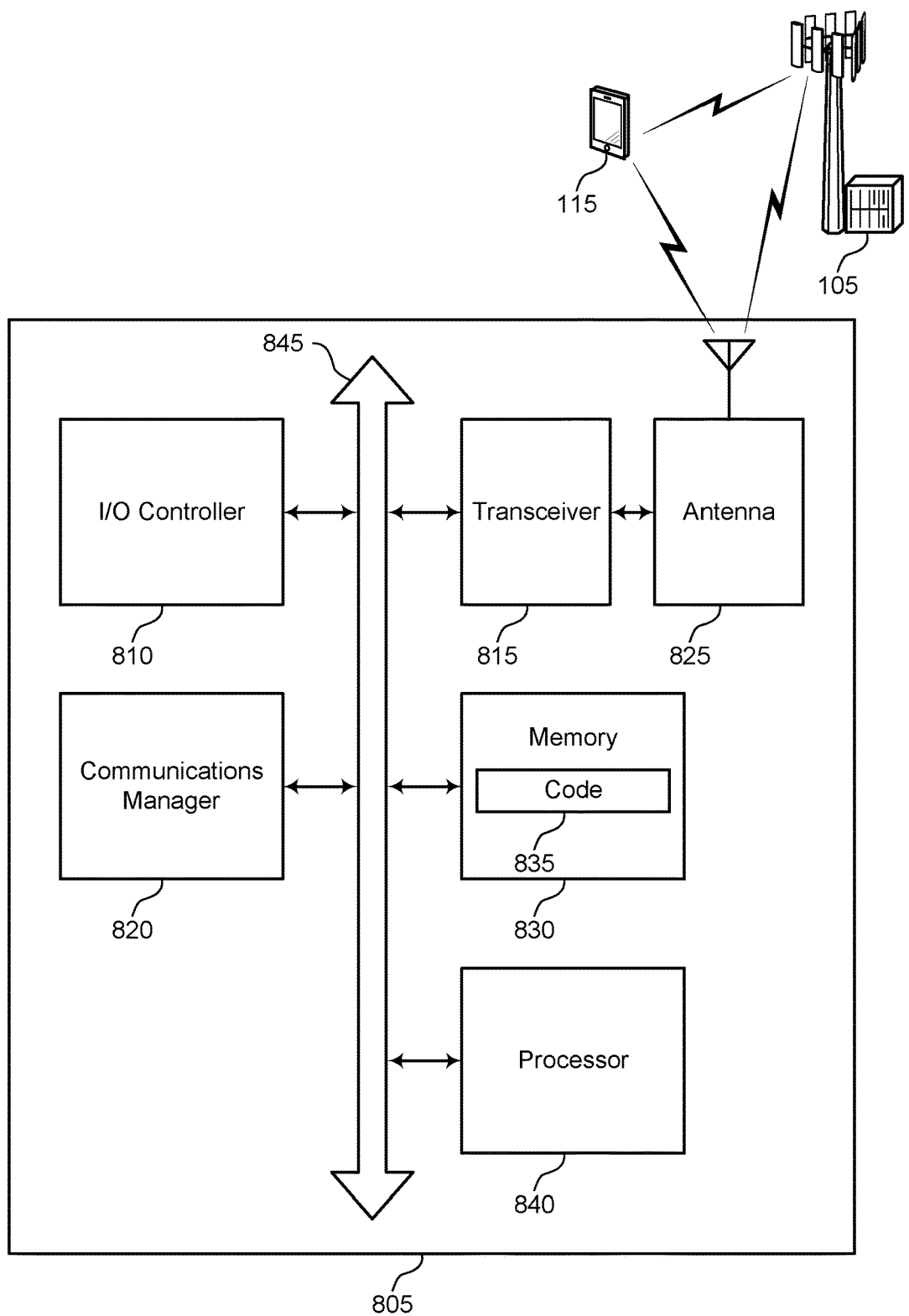
FIG. 8 shows a diagram of a system including a UE that supports physical alignment for multiple input multiple output devices in accordance with aspects of the present disclosure.

FIG. 8 shows a diagram of a system including a device 805 that supports physical alignment for multiple input multiple output devices in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (for example, when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (for example, the memory 830) to cause the device 805 to perform various functions (for example, functions or tasks supporting physical alignment for multiple input multiple output devices). For example, the device 805 or a component of the device 805 may include a processor 840 and memory 830 coupled to the processor 840, the processor 840 and memory 830 configured to perform various functions described herein.

The communications manager 820 may support wireless communication at a first device in accordance with examples as disclosed herein. For example, the communications manager 820 may be configured as or otherwise support a means for receiving, at a first antenna of a first antenna array of the first device from a second antenna of a second antenna array of a second device, a first set of reference signals that includes one or more reference signals. The communications manager 820 may be configured as or otherwise support a means for measuring, based at least in part on receiving the first set of reference signals, one or more first phases for the one or more reference signals. The communications manager 820 may be configured as or otherwise support a means for estimating, based at least in part on the measured one or more first phases, a linear offset between the first antenna array and the second antenna array. The communications manager 820 may be configured as or otherwise support a means for adjusting an alignment of the first antenna array based on the estimated linear offset. The communications manager 820 may be configured as or otherwise support a means for receiving, at a first set of multiple antennas of the first antenna array from a second set of multiple antennas of the second antenna array, a second set of reference signals that includes a set of multiple reference signals. The communications manager 820 may be configured as or otherwise support a means for measuring, based at least in part on receiving the second set of reference signals, a second set of multiple phases, each phase of the second set of multiple phases being measured for a respective reference signal of the set of multiple reference signals. The communications manager 820 may be configured as or otherwise support a means for estimating, based at least in part on the second set of multiple phases, one or more rotational offsets between the first antenna array and the second antenna array. The communications manager 820 may be configured as or otherwise support a means for adjusting the alignment of the first antenna array based on the estimated one or more rotational offsets.

By including or configuring the communications manager 820 in accordance with examples as described herein, the device 805 may support techniques for improved communication reliability by supporting orthogonality in LoS MIMO schemes. More particularly, by estimating misalignment of antenna arrays and adjusting based on the misalignment of the antenna arrays, the technique supports efficient communications because orthogonality may be maintained for the communications.

In some examples, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of physical alignment for multiple input multiple output devices as described herein, or the processor 840 and the memory 830 may be otherwise configured to perform or support such operations.

Figure 9:
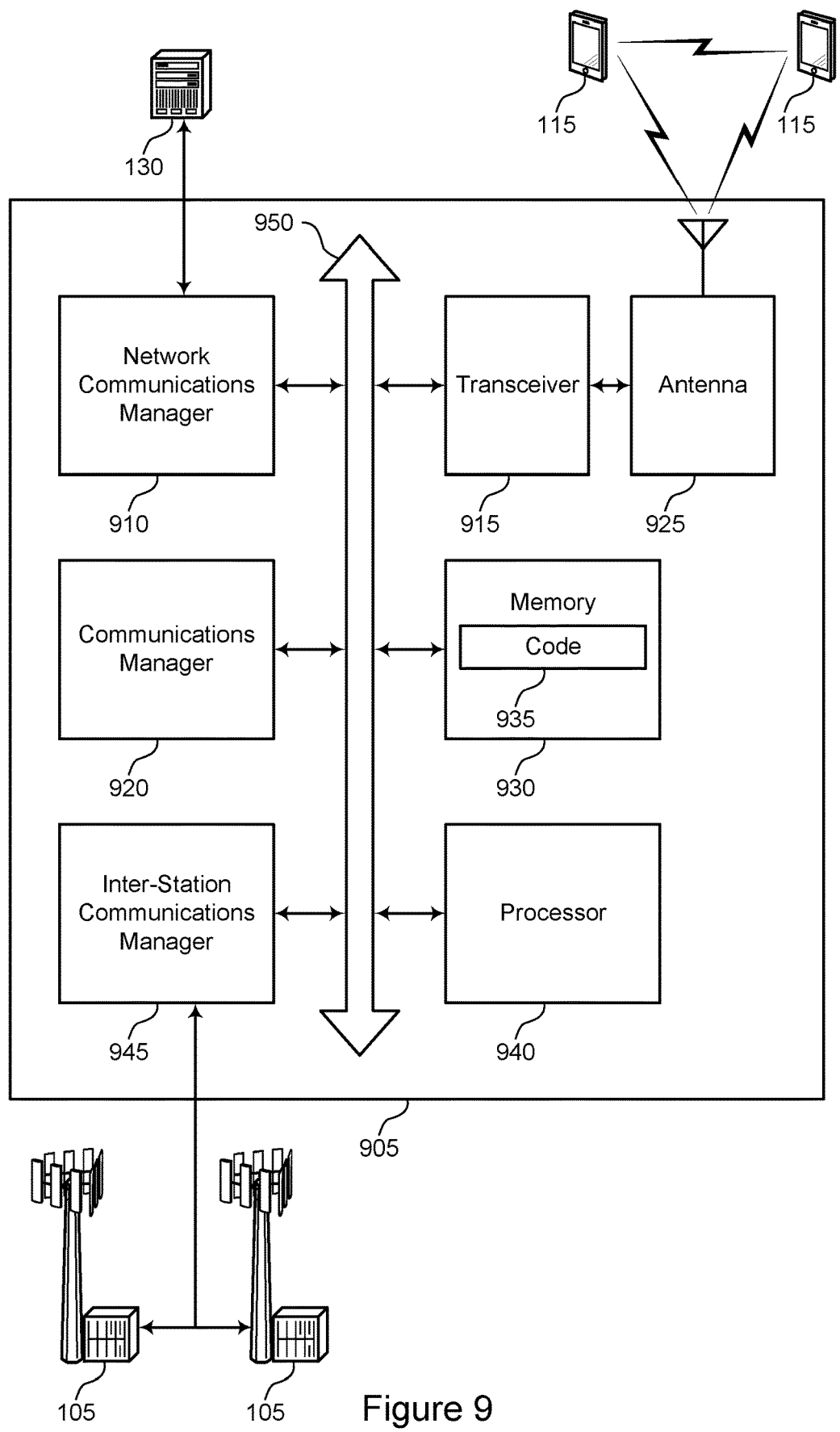
FIG. 9 shows a diagram of a system including a base station that supports physical alignment for multiple input multiple output devices in accordance with aspects of the present disclosure.

FIG. 9 shows a diagram of a system including a device 905 that supports physical alignment for multiple input multiple output devices in accordance with aspects of the present disclosure. The device 905 may be an example of or include the components of a device 505, a device 605, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (for example, operatively, communicatively, functionally, electronically, electrically) via one or more buses (for example, a bus 950).

The network communications manager 910 may manage communications with a core network 130 (for example, via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (for example, when compiled and executed) to perform functions described herein. In some cases, the memory 930 may contain, among other things, a BIOS which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting physical alignment for multiple input multiple output devices). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a first device in accordance with examples as disclosed herein. For example, the communications manager 920 may be configured as or otherwise support a means for receiving, at a first antenna of a first antenna array of the first device from a second antenna of a second antenna array of a second device, a first set of reference signals that includes one or more reference signals. The communications manager 920 may be configured as or otherwise support a means for measuring, based at least in part on receiving the first set of reference signals, one or more first phases for the one or more reference signals. The communications manager 920 may be configured as or otherwise support a means for estimating, based at least in part on the measured one or more first phases, a linear offset between the first antenna array and the second antenna array. The communications manager 920 may be configured as or otherwise support a means for adjusting an alignment of the first antenna array based on the estimated linear offset. The communications manager 920 may be configured as or otherwise support a means for receiving, at a first set of multiple antennas of the first antenna array from a second set of multiple antennas of the second antenna array, a second set of reference signals that includes a set of multiple reference signals. The communications manager 920 may be configured as or otherwise support a means for measuring, based at least in part on receiving the second set of reference signals, a second set of multiple phases, each phase of the second set of multiple phases being measured for a respective reference signal of the set of multiple reference signals. The communications manager 920 may be configured as or otherwise support a means for estimating, based at least in part on the second set of multiple phases, one or more rotational offsets between the first antenna array and the second antenna array. The communications manager 920 may be configured as or otherwise support a means for adjusting the alignment of the first antenna array based on the estimated one or more rotational offsets.

By including or configuring the communications manager 920 in accordance with examples as described herein, the device 905 may support techniques for improved communication reliability by supporting orthogonality in LoS MIMO schemes. More particularly, by estimating misalignment of antenna arrays and adjusting based on the misalignment of the antenna arrays, the technique supports efficient communications because orthogonality may be maintained for the communications.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of physical alignment for multiple input multiple output devices as described herein, or the processor 940 and the memory 930 may be otherwise configured to perform or support such operations.

Figure 10:
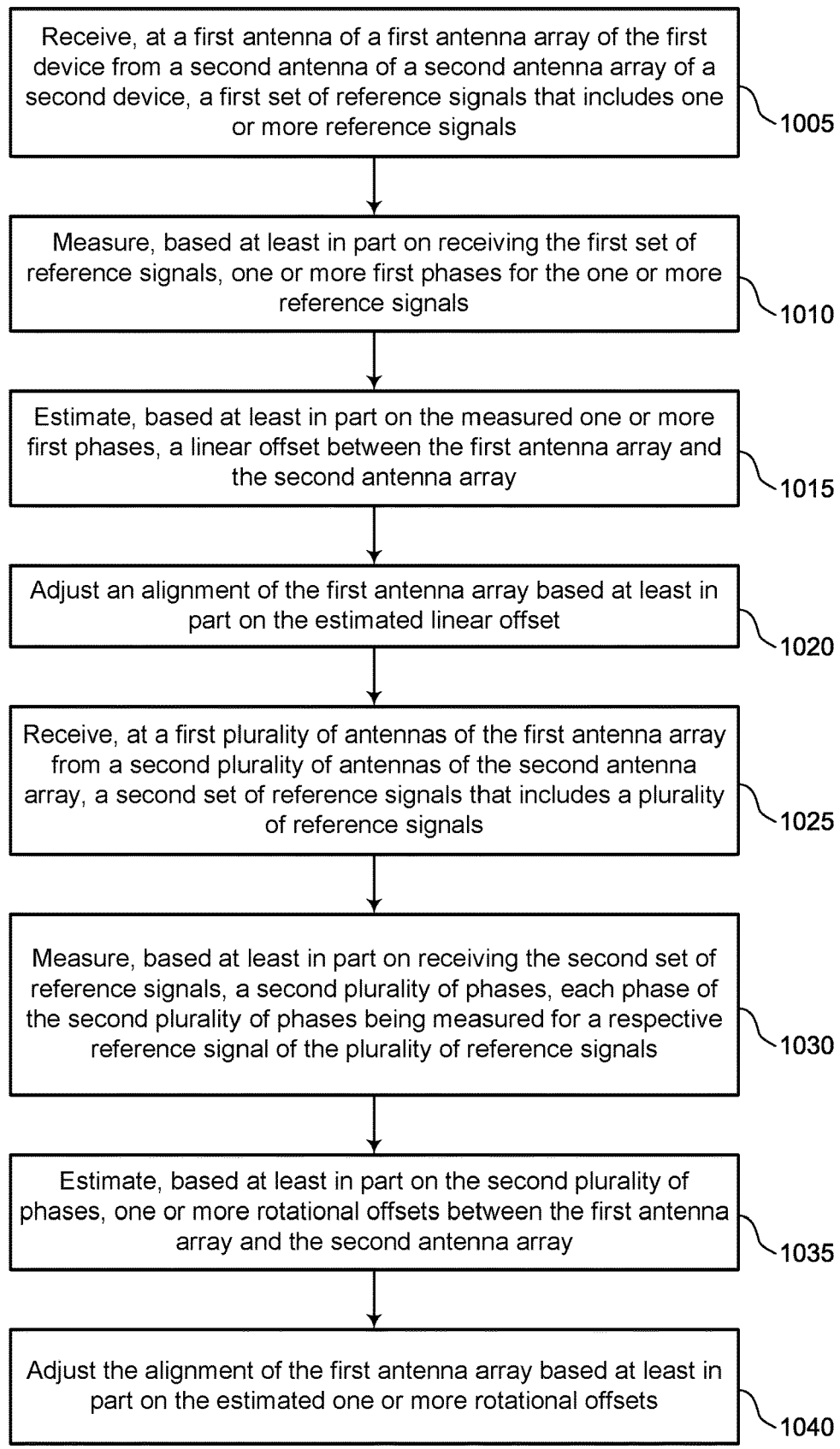
FIGS. 10 through 12 show flowcharts illustrating methods that support physical alignment for multiple input multiple output devices in accordance with aspects of the present disclosure.

FIG. 10 shows a flowchart illustrating a method 1000 that supports physical alignment for multiple input multiple output devices in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1-9. In some examples, a UE or a base station may execute a set of instructions to control the functional elements of the UE or the base station to perform the described functions. Additionally, or alternatively, the UE or the base station may perform aspects of the described functions using special-purpose hardware.

At 1005, the method may include receiving, at a first antenna of a first antenna array of the first device from a second antenna of a second antenna array of a second device, a first set of reference signals that includes one or more reference signals. The operations of 1005 may be performed in accordance with examples as disclosed herein. In some examples, aspects of the operations of 1005 may be performed by a first reference signal interface 725 as described with reference to FIG. 7.

At 1010, the method may include measuring, based on receiving the first set of reference signals, one or more first phases for the one or more reference signals. The operations of 1010 may be performed in accordance with examples as disclosed herein. In some examples, aspects of the operations of 1010 may be performed by a first phase measurement component 730 as described with reference to FIG. 7.

At 1015, the method may include estimating, based on the measured one or more first phases, a linear offset between the first antenna array and the second antenna array. The operations of 1015 may be performed in accordance with examples as disclosed herein. In some examples, aspects of the operations of 1015 may be performed by a linear offset estimation component 735 as described with reference to FIG. 7.

At 1020, the method may include adjusting an alignment of the first antenna array based on the estimated linear offset. The operations of 1020 may be performed in accordance with examples as disclosed herein. In some examples, aspects of the operations of 1020 may be performed by an offset adjustment component 740 as described with reference to FIG. 7.

At 1025, the method may include receiving, at a first set of multiple antennas of the first antenna array from a second set of multiple antennas of the second antenna array, a second set of reference signals that includes a set of multiple reference signals. The operations of 1025 may be performed in accordance with examples as disclosed herein. In some examples, aspects of the operations of 1025 may be performed by a second reference signal interface 745 as described with reference to FIG. 7.

At 1030, the method may include measuring, based on receiving the second set of reference signals, a second set of multiple phases, each phase of the second set of multiple phases being measured for a respective reference signal of the set of multiple reference signals. The operations of 1030 may be performed in accordance with examples as disclosed herein. In some examples, aspects of the operations of 1030 may be performed by a second phase measurement component 750 as described with reference to FIG. 7.

At 1035, the method may include estimating, based on the second set of multiple phases, one or more rotational offsets between the first antenna array and the second antenna array. The operations of 1035 may be performed in accordance with examples as disclosed herein. In some examples, aspects of the operations of 1035 may be performed by a rotational angle estimation component 755 as described with reference to FIG. 7.

At 1040, the method may include adjusting the alignment of the first antenna array based on the estimated one or more rotational offsets. The operations of 1040 may be performed in accordance with examples as disclosed herein. In some examples, aspects of the operations of 1040 may be performed by an angle adjustment component 760 as described with reference to FIG. 7.

Figure 11:
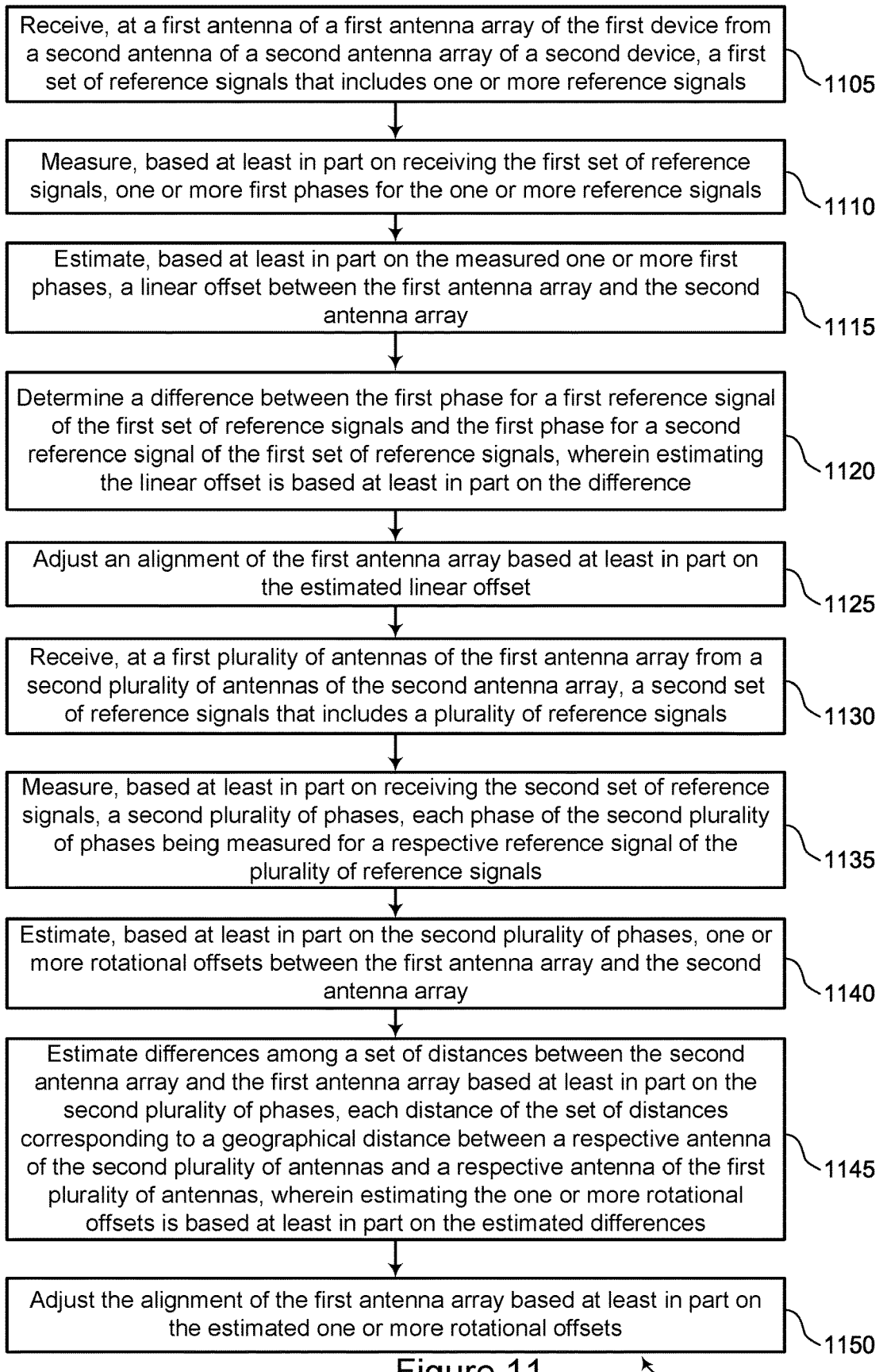

FIG. 11 shows a flowchart illustrating a method 1100 that supports physical alignment for multiple input multiple output devices in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1-9. In some examples, a UE or a base station may execute a set of instructions to control the functional elements of the UE or the base station to perform the described functions. Additionally, or alternatively, the UE or the base station may perform aspects of the described functions using special-purpose hardware.

At 1105, the method may include receiving, at a first antenna of a first antenna array of the first device from a second antenna of a second antenna array of a second device, a first set of reference signals that includes one or more reference signals. The operations of 1105 may be performed in accordance with examples as disclosed herein. In some examples, aspects of the operations of 1105 may be performed by a first reference signal interface 725 as described with reference to FIG. 7.

At 1110, the method may include measuring, based on receiving the first set of reference signals, one or more first phases for the one or more reference signals. The operations of 1110 may be performed in accordance with examples as disclosed herein. In some examples, aspects of the operations of 1110 may be performed by a first phase measurement component 730 as described with reference to FIG. 7.

At 1115, the method may include estimating, based on the measured one or more first phases, a linear offset between the first antenna array and the second antenna array. The operations of 1115 may be performed in accordance with examples as disclosed herein. In some examples, aspects of the operations of 1115 may be performed by a linear offset estimation component 735 as described with reference to FIG. 7.

At 1120, the method may include determining a difference between a first phase for a first reference signal of the first set of reference signals and the first phase for a second reference signal of the first set of reference signals, where estimating the linear offset is based on the difference. The operations of 1120 may be performed in accordance with examples as disclosed herein. In some examples, aspects of the operations of 1120 may be performed by a phase difference component 765 as described with reference to FIG. 7.

At 1125, the method may include adjusting an alignment of the first antenna array based on the estimated linear offset. The operations of 1125 may be performed in accordance with examples as disclosed herein. In some examples, aspects of the operations of 1125 may be performed by an offset adjustment component 740 as described with reference to FIG. 7.

At 1130, the method may include receiving, at a first set of multiple antennas of the first antenna array from a second set of multiple antennas of the second antenna array, a second set of reference signals that includes a set of multiple reference signals. The operations of 1130 may be performed in accordance with examples as disclosed herein. In some examples, aspects of the operations of 1130 may be performed by a second reference signal interface 745 as described with reference to FIG. 7.

At 1135, the method may include measuring, based on receiving the second set of reference signals, a second set of multiple phases, each phase of the second set of multiple phases being measured for a respective reference signal of the set of multiple reference signals. The operations of 1135 may be performed in accordance with examples as disclosed herein. In some examples, aspects of the operations of 1135 may be performed by a second phase measurement component 750 as described with reference to FIG. 7.

At 1140, the method may include estimating, based on the second set of multiple phases, one or more rotational offsets between the first antenna array and the second antenna array. The operations of 1140 may be performed in accordance with examples as disclosed herein. In some examples, aspects of the operations of 1140 may be performed by a rotational angle estimation component 755 as described with reference to FIG. 7.

At 1145, the method may include estimating differences among a set of distances between the second antenna array and the first antenna array based on the second set of multiple phases, each distance of the set of distances corresponding to a geographical distance between a respective antenna of the second set of multiple antennas and a respective antenna of the first set of multiple antennas, where estimating the one or more rotational offsets is based on the estimated differences among. The operations of 1145 may be performed in accordance with examples as disclosed herein. In some examples, aspects of the operations of 1145 may be performed by a distance estimation component 775 as described with reference to FIG. 7.

At 1150, the method may include adjusting the alignment of the first antenna array based on the estimated one or more rotational offsets. The operations of 1150 may be performed in accordance with examples as disclosed herein. In some examples, aspects of the operations of 1150 may be performed by an angle adjustment component 760 as described with reference to FIG. 7.

Figure 12:
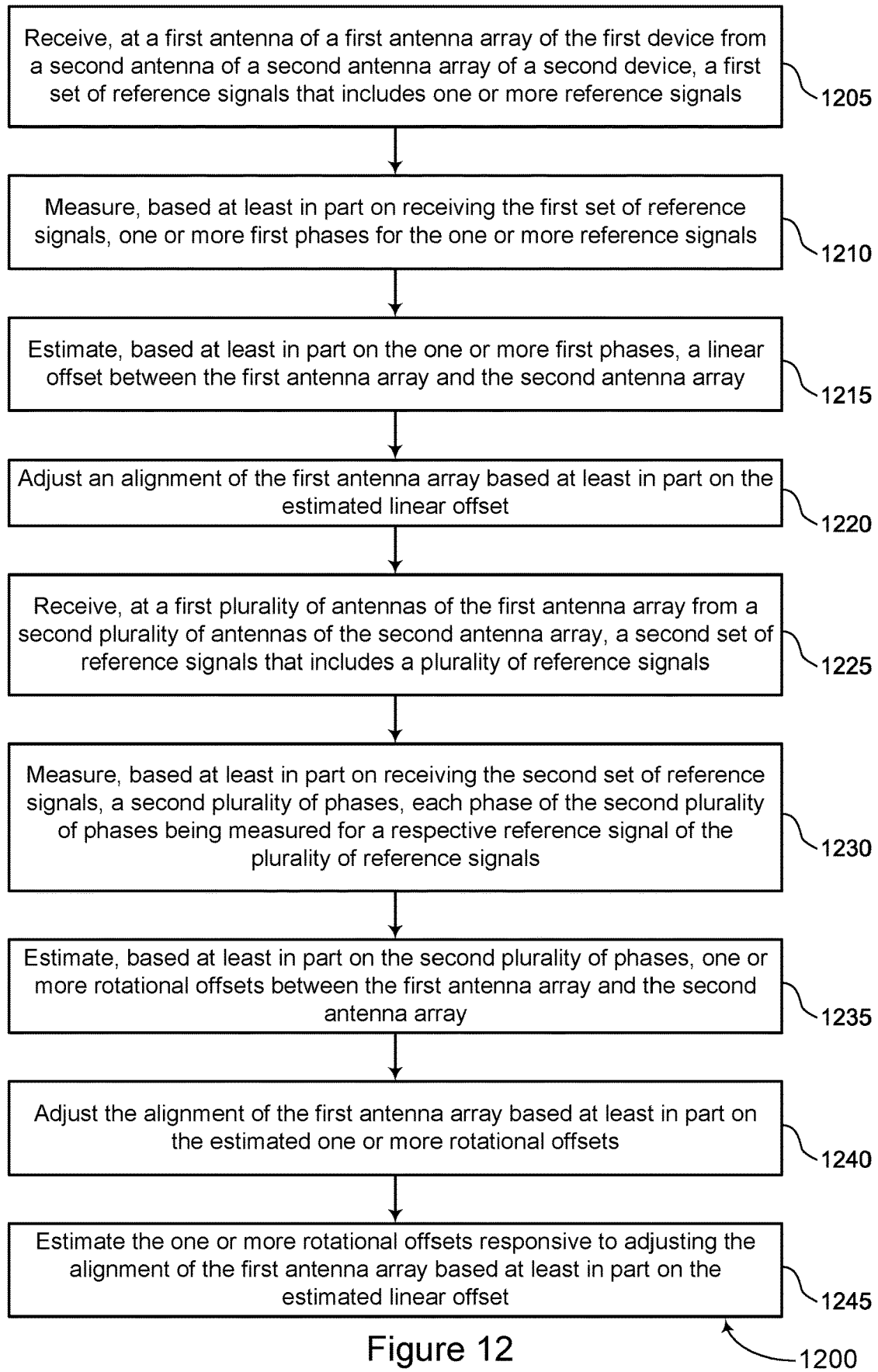

FIG. 12 shows a flowchart illustrating a method 1200 that supports physical alignment for multiple input multiple output devices in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1-9. In some examples, a UE or a base station may execute a set of instructions to control the functional elements of the UE or the base station to perform the described functions. Additionally, or alternatively, the UE or the base station may perform aspects of the described functions using special-purpose hardware.

At 1205, the method may include receiving, at a first antenna of a first antenna array of the first device from a second antenna of a second antenna array of a second device, a first set of reference signals that includes one or more reference signals. The operations of 1205 may be performed in accordance with examples as disclosed herein. In some examples, aspects of the operations of 1205 may be performed by a first reference signal interface 725 as described with reference to FIG. 7.

At 1210, the method may include measuring, based on receiving the first set of reference signals, one or more first phases for the one or more reference signals. The operations of 1210 may be performed in accordance with examples as disclosed herein. In some examples, aspects of the operations of 1210 may be performed by a first phase measurement component 730 as described with reference to FIG. 7.

At 1215, the method may include estimating, based on the measured one or more first phases, a linear offset between the first antenna array and the second antenna array. The operations of 1215 may be performed in accordance with examples as disclosed herein. In some examples, aspects of the operations of 1215 may be performed by a linear offset estimation component 735 as described with reference to FIG. 7.

At 1220, the method may include adjusting an alignment of the first antenna array based on the estimated linear offset. The operations of 1220 may be performed in accordance with examples as disclosed herein. In some examples, aspects of the operations of 1220 may be performed by an offset adjustment component 740 as described with reference to FIG. 7.

At 1225, the method may include receiving, at a first set of multiple antennas of the first antenna array from a second set of multiple antennas of the second antenna array, a second set of reference signals that includes a set of multiple reference signals. The operations of 1225 may be performed in accordance with examples as disclosed herein. In some examples, aspects of the operations of 1225 may be performed by a second reference signal interface 745 as described with reference to FIG. 7.

At 1230, the method may include measuring, based on receiving the second set of reference signals, a second set of multiple phases, each phase of the second set of multiple phases being measured for a respective reference signal of the set of multiple reference signals. The operations of 1230 may be performed in accordance with examples as disclosed herein. In some examples, aspects of the operations of 1230 may be performed by a second phase measurement component 750 as described with reference to FIG. 7.

At 1235, the method may include estimating, based on the second set of multiple phases, one or more rotational offsets between the first antenna array and the second antenna array. The operations of 1235 may be performed in accordance with examples as disclosed herein. In some examples, aspects of the operations of 1235 may be performed by a rotational angle estimation component 755 as described with reference to FIG. 7.

At 1240, the method may include adjusting the alignment of the first antenna array based on the estimated one or more rotational offsets. The operations of 1240 may be performed in accordance with examples as disclosed herein. In some examples, aspects of the operations of 1240 may be performed by an angle adjustment component 760 as described with reference to FIG. 7.

At 1245, the method may include estimating the one or more rotational offsets responsive to adjusting the alignment of the first antenna array based on the estimated linear offset. The operations of 1245 may be performed in accordance with examples as disclosed herein. In some examples, aspects of the operations of 1245 may be performed by a rotational angle estimation component 755 as described with reference to FIG. 7.

The following provides an overview of aspects of the present disclosure:

Aspect 1: A method for wireless communication at a first device, comprising: receiving, at a first antenna of a first antenna array of the first device from a second antenna of a second antenna array of a second device, a first set of reference signals that includes one or more reference signals; measuring, based at least in part on receiving the first set of reference signals, one or more first phases for the one or more reference signals; estimating, based at least in part on the measured one or more first phases, a linear offset between the first antenna array and the second antenna array; adjusting an alignment of the first antenna array based at least in part on the estimated linear offset; receiving, at a first plurality of antennas of the first antenna array from a second plurality of antennas of the second antenna array, a second set of reference signals that includes a plurality of reference signals; measuring, based at least in part on receiving the second set of reference signals, a second plurality of phases, each phase of the second plurality of phases being measured for a respective reference signal of the plurality of reference signals; estimating, based at least in part on the second plurality of phases, one or more rotational offsets between the first antenna array and the second antenna array; and adjusting the alignment of the first antenna array based at least in part on the estimated one or more rotational offsets.

Aspect 2: The method of aspect 1, wherein estimating the linear offset comprises determining a difference between a first phase for a first reference signal of the first set of reference signals and the first phase for a second reference signal of the first set of reference signals, estimating the linear offset is based at least in part on the difference.

Aspect 3: The method of any of aspects 1 through 2, further comprising determining a difference between a first a linear distance between the first antenna of the first antenna array of the first device and the second antenna of the second antenna array of the second device and a second linear distance between the first antenna of the first antenna array and a third antenna of the second antenna array based at least in part on the one or more first phases, wherein estimating the linear offset is based at least in part on the determined difference.

Aspect 4: The method of any of aspects 1 through 3, wherein receiving the first set of reference signals comprises receiving the first set of reference signals at the first antenna that is centered within the first antenna array, estimating the linear offset is based at least in part on receiving the first set of reference signals at the first antenna that is centered within the first antenna array.

Aspect 5: The method of any of aspects 1 through 4, wherein estimating the linear offset comprises estimating the linear offset based at least in part on a location of the second antenna within the second antenna array.

Aspect 6: The method of aspect 5, wherein the location is on a first axis and a second axis that is perpendicular to the first axis on the second antenna array, and estimating the linear offset comprises estimating the linear offset based at least in part on the first axis and the second axis.

Aspect 7: The method of any of aspects 5 through 6, wherein the location is a set of equidistant points from a center of the second antenna, and estimating the linear offset comprises estimating the linear offset based at least in part on the set of equidistant points.

Aspect 8: The method of any of aspects 1 through 7, wherein estimating the one or more rotational offsets comprises estimating the one or more rotational offsets responsive to adjusting the alignment of the first antenna array based at least in part on the estimated linear offset.

Aspect 9: The method of any of aspects 1 through 8, wherein estimating the one or more rotational offsets comprises estimating differences among a set of distances between the second antenna array and the first antenna array based at least in part on the second plurality of phases, each distance of the set of distances corresponding to a geographical distance between a respective antenna of the second plurality of antennas and a respective antenna of the first plurality of antennas, estimating the one or more rotational offsets is based at least in part on the estimated differences.

Aspect 10: The method of aspect 9, further comprising estimating the one or more rotational offsets further based at least in part on a condition that each distance of the set of distances is to have a same value when the first plurality of antennas are aligned with the second plurality of antennas.

Aspect 11: The method of any of aspects 1 through 10, wherein receiving the second set of reference signals comprises receiving the second set of reference signals at the first plurality of antennas that are positioned at a noncentral location of the first antenna array, estimating one or more rotational offsets is based at least in part on receiving the second set of reference signals at the first plurality of antennas that are positioned at the noncentral location of the first antenna array.

Aspect 12: The method of any of aspects 1 through 11, wherein estimating the one or more rotational offsets comprises: estimating a first rotational offset of the one or more offsets angles based at least in part on the second plurality of phases; adjusting the alignment of the first antenna array in accordance with the first rotational offset; and estimating a second rotational offset of the one or more rotational angles based at least in part on adjusting the alignment of the first antenna array in accordance with the first rotational offset.

Aspect 13: The method of any of aspects 1 through 12, wherein the first set of reference signals, the second set of reference signals, or both are received at both a first frequency and a second frequency, further comprising: measuring the one or more first phases, measuring the second plurality of phases, or both are based at least in part on receiving the first set of reference signals or the second set of reference signals at the first frequency and at the second frequency.

Aspect 14: The method of aspect 13, wherein the first frequency and the second frequency are within a threshold frequency range that is based at least in part on a sub-carrier spacing, a physical resource block size, or both.

Aspect 15: The method of any of aspects 1 through 14, further comprising: comparing two or more phases measured for the first set of reference signals, the second set of reference signals, or both, to a phase tolerance threshold; and estimating the linear offset, the one or more rotational offsets, or both based at least in part on the two or more phases satisfying the phase tolerance threshold.

Aspect 16: The method of any of aspects 1 through 15, further comprising comparing two or more of phases measured for respective two or more reference signals of the first set of reference signals, the second set of reference signals, or both, based at least in part on the two or more reference signals being received at a same time, wherein estimating the linear offset, estimating the one or more rotational offsets, or both are based at least in part on comparing the two or more phases.

Aspect 17: The method of any of aspects 1 through 16, further comprising: reestimating a rotational offset of the one or more rotational offsets after the alignment of the first antenna array is adjusted based at least in part on the estimated one or more rotational offsets; and readjusting the first antenna array based at least in part on the reestimated rotational offset such that the adjustment of the first antenna array satisfies a rotational adjustment threshold.

Aspect 18: The method of any of aspects 1 through 17, wherein estimating the one or more rotational offsets comprises: adjusting a position of the first antenna array along an axis perpendicular to the second antenna array; and monitoring a slope of phase changes based at least in part on measurements of the second set of reference signals and estimating the one or more rotational offsets based at least in part on the slope of phase changes.

Aspect 19: The method of any of aspects 1 through 18, wherein adjusting the alignment of the first antenna array based at least in part on the estimated linear offset comprises adjusting the alignment of the first antenna array such that a first axis of the first antenna array is centered with a second axis of the second antenna array based at least in part on the estimated linear offset.

Aspect 20: The method of any of aspects 1 through 19, wherein adjusting the alignment of the first antenna array based at least in part on the one or more rotational offsets comprises adjusting the alignment of the first antenna array such that the first plurality of antennas of the first antenna array are aligned along two or more axis with the second plurality of antennas of the second antenna array.

Aspect 21: An apparatus for wireless communication at a first device, comprising a processor; memory coupled with the processor; and instructions stored in the memory and executable by the processor to cause the apparatus to perform a method of any of aspects 1 through 20.

Aspect 22: An apparatus for wireless communication at a first device, comprising at least one means for performing a method of any of aspects 1 through 20.

Aspect 23: A non-transitory computer-readable medium storing code for wireless communication at a first device, the code comprising instructions executable by a processor to perform a method of any of aspects 1 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the herein are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless communication device, comprising:
    receiving, at at least a first antenna of a first antenna array of the first wireless communication device from at least a second antenna of a second antenna array of a second wireless communication device, a first set of one or more reference signals, the first antenna array including a first set of antennas that includes a plurality of antennas including the first antenna;
    measuring, in association with receiving the first set of reference signals, a first set of one or more phases for the first set of reference signals;
    estimating, in accordance with the measured first set of phases, a linear offset between the first antenna array and the second antenna array;
    adjusting an alignment of the first antenna array in accordance with the estimated linear offset;
    receiving, at the first set of antennas of the first antenna array from a second set of antennas of the second antenna array after adjusting the alignment of the first antenna array in accordance with the linear offset, a second set of reference signals that includes a plurality of reference signals;
    measuring, in association with receiving the second set of reference signals, a second set of phases that includes a plurality of phases, each phase of the second set of phases being measured for a respective reference signal of the second set of reference signals;
    estimating, in accordance with the second set of phases and in accordance with adjusting the alignment of the first antenna array in accordance with the estimated linear offset, one or more rotational offsets between the first antenna array and the second antenna array; and
    adjusting the alignment of the first antenna array in accordance with the estimated one or more rotational offsets.

2. The method of claim 1, wherein estimating the linear offset comprises determining a difference between a first phase for a first reference signal of the first set of reference signals and the first phase for a second reference signal of the first set of reference signals, wherein estimating the linear offset is based at least in part on the difference.

3. The method of claim 1, further comprising determining a difference between a first a linear distance between the first antenna of the first antenna array of the first wireless communication device and the second antenna of the second antenna array of the second wireless communication device and a second linear distance between the first antenna of the first antenna array and a third antenna of the second antenna array based at least in part on the first set of phases, wherein estimating the linear offset is based at least in part on the determined difference.

4. The method of claim 1, wherein receiving the first set of reference signals comprises receiving the first set of reference signals at the first antenna that is centered within the first antenna array, wherein estimating the linear offset is based at least in part on receiving the first set of reference signals at the first antenna that is centered within the first antenna array.

5. The method of claim 1, wherein estimating the linear offset comprises estimating the linear offset based at least in part on a location of the second antenna within the second antenna array.

6. The method of claim 5, wherein the location is on a first axis and a second axis that is perpendicular to the first axis on the second antenna array, and wherein estimating the linear offset comprises estimating the linear offset based at least in part on the first axis and the second axis.

7. The method of claim 5, wherein the location is a set of equidistant points from a center of the second antenna, and wherein estimating the linear offset comprises estimating the linear offset based at least in part on the set of equidistant points.

8. The method of claim 1, wherein estimating the one or more rotational offsets comprises estimating differences among a set of distances between the second antenna array and the first antenna array based at least in part on the second set of phases, each distance of the set of distances corresponding to a geographical distance between a respective antenna of the second set of antennas and a respective antenna of the first set of antennas, wherein estimating the one or more rotational offsets is based at least in part on the estimated differences.

9. The method of claim 8, further comprising estimating the one or more rotational offsets further based at least in part on a condition that each distance of the set of distances is to have a same value when the first set of antennas are aligned with the second set of antennas.

10. The method of claim 1, wherein receiving the second set of reference signals comprises receiving the second set of reference signals at the first set of antennas that are positioned at a noncentral location of the first antenna array, wherein estimating one or more rotational offsets is based at least in part on receiving the second set of reference signals at the first set of antennas that are positioned at the noncentral location of the first antenna array.

11. The method of claim 1, wherein estimating the one or more rotational offsets comprises:
   estimating a first rotational offset of the one or more offsets angles based at least in part on the second set of phases;
   adjusting the alignment of the first antenna array in accordance with the first rotational offset; and
   estimating a second rotational offset of the one or more rotational angles based at least in part on adjusting the alignment of the first antenna array in accordance with the first rotational offset.

12. The method of claim 1, wherein the first set of reference signals, the second set of reference signals, or both are received at both a first frequency and a second frequency, further comprising:
   measuring the first set of phases, measuring the second set of phases, or both are based at least in part on receiving the first set of reference signals or the second set of reference signals at the first frequency and at the second frequency.

13. The method of claim 12, wherein the first frequency and the second frequency are within a threshold frequency range that is based at least in part on a sub-carrier spacing, a physical resource block size, or both.

14. The method of claim 1, further comprising:
   comparing two or more phases measured for the first set of reference signals, the second set of reference signals, or both, to a phase tolerance threshold; and
   estimating the linear offset, the one or more rotational offsets, or both based at least in part on the two or more phases satisfying the phase tolerance threshold.

15. The method of claim 1, further comprising comparing two or more of phases measured for respective two or more reference signals of the first set of reference signals, the second set of reference signals, or both, based at least in part on the two or more reference signals being received at a same time, wherein estimating the linear offset, estimating the one or more rotational offsets, or both are based at least in part on comparing the two or more phases.

16. The method of claim 1, further comprising:
   reestimating a rotational offset of the one or more rotational offsets after the alignment of the first antenna array is adjusted based at least in part on the estimated one or more rotational offsets; and
   readjusting the first antenna array based at least in part on the reestimated rotational offset such that the adjustment of the first antenna array satisfies a rotational adjustment threshold.

17. The method of claim 1, wherein estimating the one or more rotational offsets comprises:
   adjusting a position of the first antenna array along an axis perpendicular to the second antenna array; and
   monitoring a slope of phase changes based at least in part on measurements of the second set of reference signals and estimating the one or more rotational offsets based at least in part on the slope of phase changes.

18. The method of claim 1, wherein adjusting the alignment of the first antenna array based at least in part on the estimated linear offset comprises adjusting the alignment of the first antenna array such that a first axis of the first antenna array is centered with a second axis of the second antenna array based at least in part on the estimated linear offset.

19. The method of claim 1, wherein adjusting the alignment of the first antenna array based at least in part on the one or more rotational offsets comprises adjusting the alignment of the first antenna array such that the first set of antennas of the first antenna array are aligned along two or more axis with the second set of antennas of the second antenna array.

20. A wireless communication device, comprising:
   one or more processors; and
   one or more memories coupled with the one or more processors and that store processor-executable code that, when executed by the one or more processors, is configured to cause the first device to:
      receive, at at least a first antenna of a first antenna array of the first wireless communication device from at least a second antenna of a second antenna array of a second wireless communication device, a first set of one or more reference signals, the first antenna array including a first set of antennas that includes a plurality of antennas including the first antenna;
      measure, in association with receiving the first set of reference signals, a first set of one or more phases for the first set of reference signals;
      estimate, in accordance with the measured first set of phases, a linear offset between the first antenna array and the second antenna array;
      adjust an alignment of the first antenna array in accordance with the estimated linear offset;
      receive, at the first set of antennas of the first antenna array from a second set of antennas of the second antenna array after adjusting the alignment of the first antenna array in accordance with the linear offset, a second set of reference signals that includes a plurality of reference signals;
      measure, in association with receiving the second set of reference signals, a second set of phases that includes a plurality of phases, each phase of the second set of phases being measured for a respective reference signal of the second set of reference signals;
      estimate, in accordance with the second set of phases and in accordance with adjusting the alignment of the first antenna array in accordance with the estimated linear offset, one or more rotational offsets between the first antenna array and the second antenna array; and
      adjust the alignment of the first antenna array in accordance with the estimated one or more rotational offsets.

21. The wireless communication device of claim 20, wherein the code to estimate the linear offset is executable by the one or more processors to cause the wireless communication device to determine a difference between a first phase for a first reference signal of the first set of reference signals and the first phase for a second reference signal of the first set of reference signals, wherein estimating the linear offset is based at least in part on the difference.

22. The wireless communication device of claim 20, wherein the code is further executable by the one or more processors to cause the wireless communication device to determine a difference between a first a linear distance between the first antenna of the first antenna array of the first wireless communication device and the second antenna of the second antenna array of the second wireless communication device and a second linear distance between the first antenna of the first antenna array and a third antenna of the second antenna array based at least in part on the first set of phases, wherein estimating the linear offset is based at least in part on the determined difference.

23. The wireless communication device of claim 20, wherein the code to receive the first set of reference signals is executable by the one or more processors to cause the wireless communication device to receive the first set of reference signals at the first antenna that is centered within the first antenna array, wherein estimating the linear offset is based at least in part on receiving the first set of reference signals at the first antenna that is centered within the first antenna array.

24. The wireless communication device of claim 20, wherein the code to estimate the linear offset is executable by the one or more processors to cause the wireless communication device to estimate the linear offset based at least in part on a location of the second antenna within the second antenna array.

25. The wireless communication device of claim 21, wherein the code to estimate the one or more rotational offsets is executable by the one or more processors to cause the wireless communication device to:
estimate differences among a set of distances between the second antenna array and the first antenna array based at least in part on the second set of phases, each distance of the set of distances corresponding to a geographical distance between a respective antenna of the second set of antennas and a respective antenna of the first set of antennas, wherein estimating the one or more rotational offsets is based at least in part on the estimated differences.

26. The wireless communication device of claim 25, wherein the code is executable by the one or more processors to cause the wireless communication device to estimate the one or more rotational offsets further based at least in part on a condition that each distance of the set of distances is to have a same value when the first set of antennas are aligned with the second set of antennas.

27. A wireless communication device, comprising:
means for receiving, at at least a first antenna of a first antenna array of the first wireless communication device from at least a second antenna of a second antenna array of a second wireless communication device, a first set of one or more reference signals, the first antenna array including a first set of antennas that includes a plurality of antennas including the first antenna;
means for measuring, in association with receiving the first set of reference signals, a first set of one or more phases for the first set of reference signals;
means for estimating, in accordance with the measured first set of phases, a linear offset between the first antenna array and the second antenna array;
means for adjusting an alignment of the first antenna array in accordance with the estimated linear offset;
means for receiving, at the first set of antennas of the first antenna array from a second set of antennas of the second antenna array after adjusting the alignment of the first antenna array in accordance with the linear offset, a second set of reference signals that includes a plurality of reference signals;
means for measuring, in association with receiving the second set of reference signals, a second set of phases that includes a plurality of phases, each phase of the second set of phases being measured for a respective reference signal of the second set of reference signals;
means for estimating, in accordance with the second set of phases and in accordance with adjusting the alignment of the first antenna array in accordance with the estimated linear offset, one or more rotational offsets between the first antenna array and the second antenna array; and
means for adjusting the alignment of the first antenna array in accordance with the estimated one or more rotational offsets.

28. A non-transitory computer-readable medium storing code for wireless communication at a first wireless communication device, the code comprising instructions executable by one or more processors to:
receive, at at least a first antenna of a first antenna array of the first wireless communication device from at least a second antenna of a second antenna array of a second wireless communication device, a first set of one or more reference signals, the first antenna array including a first set of antennas that includes a plurality of antennas including the first antenna;
measure, in association with receiving the first set of reference signals, a first set of one or more phases for the first set of reference signals;
estimate, in accordance with the measured first set of phases, a linear offset between the first antenna array and the second antenna array;
adjust an alignment of the first antenna array in accordance with the estimated linear offset;
receive, at the first set of antennas of the first antenna array from a second set of antennas of the second antenna array after adjusting the alignment of the first antenna array in accordance with the linear offset, a second set of reference signals that includes a plurality of reference signals;
measure, in association with receiving the second set of reference signals, a second set of phases that includes a plurality of phases, each phase of the second set of phases being measured for a respective reference signal of the second set of reference signals;
estimate, in accordance with the second set of phases and in accordance with adjusting the alignment of the first antenna array in accordance with the estimated linear offset, one or more rotational offsets between the first antenna array and the second antenna array; and
adjust the alignment of the first antenna array in accordance with the estimated one or more rotational offsets.

* * * * *